United States Patent
Nakajima et al.

(10) Patent No.: US 6,550,272 B2
(45) Date of Patent: Apr. 22, 2003

(54) ABSORPTION CHILLER/ABSORPTION CHILLER-HEATER HAVING SAFETY DEVICE

(75) Inventors: Kunihiko Nakajima, Ootsu (JP); Kenichi Saitou, Funabashi (JP); Hideharu Arai, Kusatsu (JP)

(73) Assignee: Kawasaki Thermal Engineering Co., Ltd., Shiga (JP)

( * ) Notice: Subject to any disclaimer, the term of this patent is extended or adjusted under 35 U.S.C. 154(b) by 3 days.

(21) Appl. No.: 10/131,215

(22) Filed: Apr. 25, 2002

(65) Prior Publication Data

US 2002/0112504 A1 Aug. 22, 2002

Related U.S. Application Data

(62) Division of application No. 09/707,840, filed on Nov. 8, 2000, now Pat. No. 6,393,863.

(51) Int. Cl.[7] .............................................. F25B 15/00
(52) U.S. Cl. .................................... 62/476; 62/141
(58) Field of Search .......................... 62/141, 148, 476, 62/498, 487, 335, 483, 485, 489

(56) References Cited

U.S. PATENT DOCUMENTS 5,653,116 A * 8/1997 Erickson et al. ............. 62/476
5,941,094 A * 8/1999 Tang et al. .................. 62/489

* cited by examiner

Primary Examiner—Chen-Wen Jiang
(74) Attorney, Agent, or Firm—Jones, Tullar & Cooper, P.C.

(57) ABSTRACT

In an absorption chiller/absorption chiller-heater wherein a pressure rise preventing means such as a safety valve, rapture disk or breakable plate is disposed in a high temperature regenerator or in the refrigerant vapor piping from the high temperature regenerator, with the discharge opening of the pressure rise preventing means being open to the atmosphere, in order to prevent the pressure rise in the high temperature regenerator, the discharge opening of safety valve is connected to low pressure units such as the low temperature regenerator through pressure relief piping so that, when the safety valve is activated, the refrigerant vapor and absorption solution of the high pressure side will be discharged to low pressure units such as the low temperature regenerator designed so as to generally maintain a vacuum therein during operation. By virtue of this construction, even when the pressure in the high temperature regenerator increases during operation causing the safety valve, rapture disk or the like to operate, it is possible to maintain the pressure reduction, assuring safety and avoiding the bad influence of corrosion due to open-to-atmosphere trouble, and also to quickly and readily perform the restoration.

32 Claims, 21 Drawing Sheets

ABSORPTION CHILLER/ABSORPTION CHILLER-HEATER HAVING SAFETY DEVICE

This application is a division of application Ser. No 09/707,840 filed Nov. 8, 2000, now U.S. Pat. No. 6,393,863.

TECHNICAL FIELD

The present invention relates to an absorption chiller/absorption chiller-heater having a safety device which is, in case of pressure increase in the shell during operation, causing a safety valve, rapture disk or the like to be activated, able to prevent open-to-atmosphere trouble, maintaining pressure reduction, and to avoid a bad influence of corrosion due to open-to-atmosphere trouble, and also to assure safety and enable earlier restoration.

BACKGROUND OF THE INVENTION

A known absorption chiller/absorption chiller-heater uses, for example, lithium bromide as absorbent and, for example, water as refrigerant, and comprises an evaporator, absorber, condenser, low temperature regenerator, high temperature regenerator, low temperature heat exchanger, high temperature heat exchanger, and solution pipe lines and refrigerant pipe lines for the connection of these devices.

In a conventional absorption chiller/absorption chiller-heater, there is provided a pressure rise preventing means such as a safety device, rapture disk or breakable plate in a high temperature regenerator or in the refrigerant vapor piping from the high temperature regenerator, as a device to prevent pressure rise when the interior pressure of the high temperature regenerator exceeds the atmospheric pressure or the set pressure level.

When the pressure inside the shell of the high temperature regenerator increases causing the safety valve, rapture disk or the like to be activated, the absorption solution and refrigerant in the high temperature regenerator will be discharged outside (outside the system), that is, the vacuum unit becomes open to the atmosphere and unable to maintain a vacuum therein that is most important for the absorption chiller/absorption chiller-heater and is also subjected to the bad influence of corrosion. Another problem is that, if the vacuum unit becomes open to the atmosphere, it will take much time for the restoration.

SUMMARY OF THE INVENTION

An object of the present invention is to provide an absorption chiller/absorption chiller-heater construction in a manner such that the discharge opening of a safety valve, rapture disk or the like is connected to the low pressure side in order to prevent open-to-atmosphere trouble, thereby maintaining pressure reduction to assure safety, and to avoid bad influences to the machine, particularly the bad influence of corrosion due to open-to-atmosphere trouble, and to perform quick and easy restoration after the operation of the safety valve, rapture disk or the like.

Also, another object of the present invention is to provide an absorption chiller/absorption chiller-heater incorporating an electric circuit which may detect the temperature or pressure change in case of refrigerant vapor or absorption solution outflow with the safety valve, rapture disk or the like activated, and stop the combustion at the high temperature regenerator or the heating source supply to discontinue the operation, and at the same time to inform the abnormality to the outside.

In order to achieve the above purposes, an absorption chiller/absorption chiller-heater having a safety device of the present invention comprises an absorber, evaporator, low temperature heat exchanger, low temperature regenerator, high temperature heat exchanger, high temperature regenerator, condenser, solution circulating pump, and solution pipes and refrigerant pipes for the connection of these devices, and in a double-effect absorption chiller/absorption chiller-heater wherein a pressure rise preventing means such as a safety valve, rapture disk or breakable plate is disposed in the high temperature regenerator or in the refrigerant vapor piping from the high temperature regenerator with the discharge opening of the pressure rise preventing means being open to the atmosphere in order to prevent the pressure rise in the high temperature regenerator when the interior pressure of the high temperature regenerator exceeds the atmospheric pressure or the set pressure level, the absorption chiller/absorption chiller-heater is constructed in a manner such that the discharge opening of the pressure rise preventing means is connected to low pressure units through pressure relief piping in order that, when the pressure in the high temperature regenerator increases during operation causing the pressure rise preventing means to operate, the refrigerant vapor and absorption solution of the high pressure side will be discharged to low pressure units designed so as to generally maintain a vacuum therein during operation, thereby preventing open-to-atmosphere trouble and facilitating the restoration after safety assurance. (See FIG. 1)

Also, an absorption chiller/absorption chiller-heater having a safety valve of the present invention comprises an absorber, evaporator, low temperature heat exchanger, low temperature regenerator, high temperature heat exchanger, high temperature regenerator, condenser, solution circulating pump, and solution pipes and refrigerant pipes for the connection of these devices, and in a double-effect absorption chiller/absorption chiller-heater wherein a pressure rise preventing means such as a safety valve, rapture disk or breakable plate is disposed in the high temperature regenerator or in the refrigerant vapor piping from the high temperature regenerator with the discharge opening of the pressure rise preventing means being open to the atmosphere in order to prevent the pressure rise in the high temperature regenerator when the interior pressure of the high temperature regenerator exceeds the atmospheric pressure or the set pressure level, the absorption chiller/absorption chiller-heater is characterized in that the discharge opening of the pressure rise preventing means is connected to low pressure units through pressure relief piping in order that, when the pressure in the high temperature regenerator increases during operation causing the pressure rise preventing means to operate, the refrigerant vapor and absorption solution of the high pressure side will be discharged to low pressure units designed so as to generally maintain a vacuum therein during operation, thereby preventing open-to-atmosphere trouble and facilitating the restoration after safety assurance, and a temperature measuring device or pressure measuring device is disposed in the pressure relief piping to detect the temperature or pressure change in case of refrigerant vapor and absorption solution outflow with the pressure rise preventing means of the high pressure side activated, and further a temperature measuring device or pressure measuring device is electrically connected to a safety control monitor unit, which may detect the temperature or pressure change to stop the heating source supply to the high temperature regenerator and to discontinue the operation and at the same time to inform the abnormality to the outside. (See FIG. 2)

Also, an absorption chiller/absorption chiller-heater having a safety valve of the present invention comprises an absorber, evaporator, low temperature heat exchanger, low temperature regenerator, medium temperature heat exchanger, medium temperature regenerator, high temperature heat exchanger, high temperature regenerator, condenser, solution circulating pump, and solution pipes and refrigerant pipes for the connection of these devices, and in a multiple-effect absorption chiller/absorption chiller-heater wherein a pressure rise preventing means such as a safety valve, rapture disk or breakable plate is disposed in the high temperature regenerator or in the refrigerant vapor piping from the high temperature regenerator with the discharge opening of the pressure rise preventing means being open to the atmosphere in order to prevent the pressure rise in the high temperature regenerator when the interior pressure of the high temperature regenerator exceeds the atmospheric pressure or the set pressure level, the absorption chiller/absorption chiller-heater is characterized in that the discharge opening of the pressure rise preventing means is connected to the medium temperature regenerator through pressure relief piping in order that, when the pressure in the high temperature regenerator increases during operation causing the pressure rise preventing means to operate, the refrigerant vapor and absorption solution of the high pressure side will be discharged to the medium temperature regenerator where the pressure level becomes low, thereby preventing open-to-atmosphere trouble and facilitating the restoration after safety assurance, and further a pressure rise preventing means such as a safety valve, rapture disk or breakable plate is disposed in the medium temperature regenerator or in the refrigerant vapor piping from the medium temperature regenerator, and the discharge opening of the pressure rise preventing means of the medium temperature regenerator is connected to low pressure units through pressure relief piping in order that, when the pressure in the medium temperature regenerator increases during operation causing the pressure rise preventing means of the medium temperature regenerator to be activated, the refrigerant vapor and absorption solution of the medium pressure side will be discharged to low pressure units designed so as to generally maintain a vacuum therein during operation, thereby preventing open-to-atmosphere trouble and facilitating the restoration after safety assurance. (See FIG. 3, FIG. 5, FIG. 6)

Also, an absorption chiller/absorption chiller-heater having a safety valve of the present invention comprises an absorber, evaporator, low temperature heat exchanger, low temperature regenerator, medium temperature heat exchanger, medium temperature regenerator, high temperature heat exchanger, high temperature regenerator, condenser, solution circulating pump, and solution pipes and refrigerant pipes for the connection of these devices, and in a multiple-effect absorption chiller/absorption chiller-heater wherein a pressure rise preventing means such as a safety valve, rapture disk or breakable plate is disposed in the high temperature regenerator or in the refrigerant vapor piping from the high temperature regenerator with the discharge opening of the pressure rise preventing means being open to the atmosphere in order to prevent the pressure rise in the high temperature regenerator when the interior pressure of the high temperature regenerator exceeds the atmospheric pressure or the set pressure level, the absorption chiller/absorption chiller-heater is characterized in that the discharge opening of the pressure rise preventing means is connected to the medium temperature regenerator through pressure relief piping in order that, when the pressure in the high temperature regenerator increases during operation causing the pressure rise preventing means to operate, the refrigerant vapor and absorption solution of the high pressure side will be discharged to the medium temperature regenerator where the pressure level becomes low, thereby preventing open-to-atmosphere trouble and facilitating the restoration after safety assurance, and further a pressure rise preventing means such as a rapture disk, breakable plate or safety valve is disposed in the medium temperature regenerator or in the refrigerant vapor piping from the medium temperature regenerator, and the discharge opening of the pressure rise preventing means of the medium temperature regenerator is connected to low pressure units through pressure relief piping in order that, when the pressure in the medium temperature regenerator increases during operation causing the pressure rise preventing means of the medium temperature regenerator to be activated, the refrigerant steam and absorption solution of the medium pressure side will be discharged to low pressure units designed so as to generally maintain a vacuum therein during operation, thereby preventing open-to-atmosphere trouble and facilitating the restoration after safety assurance, and a temperature measuring device or pressure measuring device is disposed in the pressure relief piping from the high pressure side to detect the temperature or pressure change in case of refrigerant vapor and absorption solution outflow with the pressure rise preventing means of the high pressure side activated, and further a temperature measuring device or pressure measuring device is electrically connected to a safety control monitor unit, which may detect the temperature or pressure change to stop the heating source supply to the high temperature regenerator and to discontinue the operation and at the same time to inform the abnormality to the outside. (See FIG. 4, FIG. 7, FIG. 8)

Also, an absorption chiller/absorption chiller-heater having a safety valve of the present invention comprises an absorber, evaporator, low temperature heat exchanger, low temperature regenerator, medium temperature heat exchanger, medium temperature regenerator, high temperature heat exchanger, high temperature regenerator, condenser, solution circulating pump, and solution piping and refrigerant piping for the connection of these devices, and in a multiple-effect absorption chiller/absorption chiller-heater wherein a pressure rise preventing means such as a safety valve, rapture disk or breakable plate is disposed in the high temperature regenerator or in the refrigerant vapor piping from the high temperature regenerator with the discharge opening of the pressure rise preventing means being open to the atmosphere in order to prevent the pressure rise in the high temperature regenerator when the interior pressure of the high temperature regenerator exceeds the atmospheric pressure or the set pressure level, the absorption chiller/absorption chiller-heater is characterized in that the discharge opening of the pressure rise preventing means is connected to low pressure units through pressure relief piping in order that, when the pressure in the high temperature regenerator increases during operation causing the pressure rise preventing means to be activated, the refrigerant steam and absorption solution of the high pressure side will be discharged to low pressure units such as the low temperature regenerator designed so as to generally maintain a vacuum therein during operation, thereby preventing open-to-atmosphere trouble and facilitating the restoration after safety assurance. (See FIG. 7, FIG. 11, FIG. 12)

Also, an absorption chiller/absorption chiller-heater having a safety valve of the present invention comprises an absorber, evaporator, low temperature heat exchanger, low temperature regenerator, medium temperature heat exchanger, medium temperature regenerator, high temperature heat exchanger, high temperature regenerator, condenser, solution circulating pump, and solution pipes and refrigerant pipes for the connection of these devices, and in a multiple-effect absorption chiller/absorption chiller-heater wherein a pressure rise preventing means such as a safety valve, rapture disk or breakable plate is disposed in the high temperature regenerator or in the refrigerant vapor piping from the high temperature regenerator with the discharge opening of the pressure rise preventing means being open to the atmosphere in order to prevent the pressure rise in the high temperature regenerator when the interior pressure of the high temperature regenerator exceeds the atmospheric pressure or the set pressure level, the absorption chiller/ absorption chiller-heater is characterized in that the discharge opening of the pressure rise preventing means is connected to low pressure units through pressure relief piping in order that, when the pressure in the high temperature regenerator increases during operation causing the pressure rise preventing means to operate, the refrigerant vapor and absorption solution of the high pressure side will be discharged to the low pressure units such as the low temperature regenerator designed so as to generally maintain a vacuum therein during operation, thereby preventing open-to-atmosphere trouble and facilitating the restoration after safety assurance, and a temperature measuring device or pressure measuring device is disposed in the pressure relief piping from the high pressure side to detect the temperature or pressure change in case of refrigerant steam and absorption solution outflow with the pressure rise preventing means of the high pressure side activated, and further a temperature measuring device or pressure measuring device is electrically connected to a safety control monitor unit, which may detect the temperature or pressure change and stop the heating source supply to the high temperature regenerator to discontinue the operation and at the same time to inform the abnormality to the outside. (See FIG. 8, FIG. 10, FIG. 13. FIG. 14)

Also, an absorption chiller/absorption chiller-heater having a safety valve of the present invention comprises an absorber, evaporator, low temperature heat exchanger, low temperature regenerator, medium temperature heat exchanger, medium temperature regenerator, high temperature heat exchanger, high temperature regenerator, condenser, solution circulating pump, and solution piping and refrigerant piping for the connection of these devices, and in a multiple-effect absorption chiller/absorption chiller-heater wherein a pressure rise preventing means such as a safety valve, rapture disk or breakable plate is disposed in the high temperature regenerator or in the refrigerant vapor piping from the high temperature regenerator with the discharge opening of the pressure rise preventing means being open to the atmosphere in order to prevent the pressure rise in the high temperature regenerator when the interior pressure of the high temperature regenerator exceeds the atmospheric pressure or the set pressure level, the absorption chiller/absorption chiller-heater is characterized in that the discharge opening of the pressure rise preventing means is connected to low pressure units through pressure relief piping in order that, when the pressure in the high temperature regenerator increases during operation causing the pressure rise preventing means to be activated, the refrigerant steam and absorption solution of the high pressure side will be parallel-discharged to the low pressure units such as the low temperature regenerator designed so as to generally maintain a vacuum therein during operation and to the medium temperature regenerator where the pressure level becomes low, thereby preventing open-to-atmosphere trouble and facilitating the restoration after safety assurance. (See FIGS. 15, 16, 17, 19, 20.)

Also, an absorption chiller/absorption chiller-heater having a safety valve of the present invention comprises an absorber, evaporator, low temperature heat exchanger, low temperature regenerator, medium temperature heat exchanger, medium temperature regenerator, high temperature heat exchanger, high temperature regenerator, condenser, solution circulating pump, and solution pipes and refrigerant pipes for the connection of these devices, and in a multiple-effect absorption chiller/absorption chiller-heater wherein a pressure rise preventing means such as a safety valve, rapture disk or breakable plate is disposed in the high temperature regenerator or in the refrigerant vapor piping from the high temperature regenerator with the discharge opening of the pressure rise preventing means being open to the atmosphere in order to prevent the pressure rise in the high temperature regenerator when the interior pressure of the high temperature regenerator exceeds the atmospheric pressure or the set pressure level, the absorption chiller/ absorption chiller-heater is characterized in that the discharge opening of the pressure rise preventing means is connected to low pressure units through pressure relief piping in order that, when the pressure in the high temperature regenerator increases during operation causing the pressure rise preventing means to operate, the refrigerant steam and absorption solution of the high pressure side will be parallel-discharged to low pressure units such as the low temperature regenerator designed so as to generally maintain a vacuum therein during operation and to the medium temperature regenerator where the pressure level becomes low, thereby preventing open-to-atmosphere trouble and facilitating the restoration after safety assurance, and a temperature measuring device or pressure measuring device is disposed in the pressure relief piping from the high pressure side to detect the temperature or pressure change in case of refrigerant steam and absorption solution outflow with the pressure rise preventing means of the high pressure side activated, and further a temperature measuring device or pressure measuring device is electrically connected to a safety control monitor unit which may detect the temperature or pressure change to stop the heating source supply to the high temperature regenerator and to discontinue the operation and at the same time to inform the abnormality to the outside. (See FIGS. 18, 21, 22.)

In the above absorption chiller/absorption chiller-heater, preferably it is desirable to use a safety valve as a pressure rise preventing means for the high pressure side and a rapture disk (or breakable plate) as a pressure rise preventing means for the medium pressure side in the case of installing a medium temperature heat exchanger and medium temperature regenerator. (See FIG. 3~FIG. 6)

Also, as the heating source for the high temperature regenerator, it is possible to use the combustion heat of fuel combustion devices, steam, and combustion exhaust gas generated from heat engines such as a gas engine and gas turbine.

It is also possible to install a once-through boiler in place of a high temperature regenerator.

DETAILED DESCRIPTION OF THE PREFERRED EMBODIMENT

Figure 1:
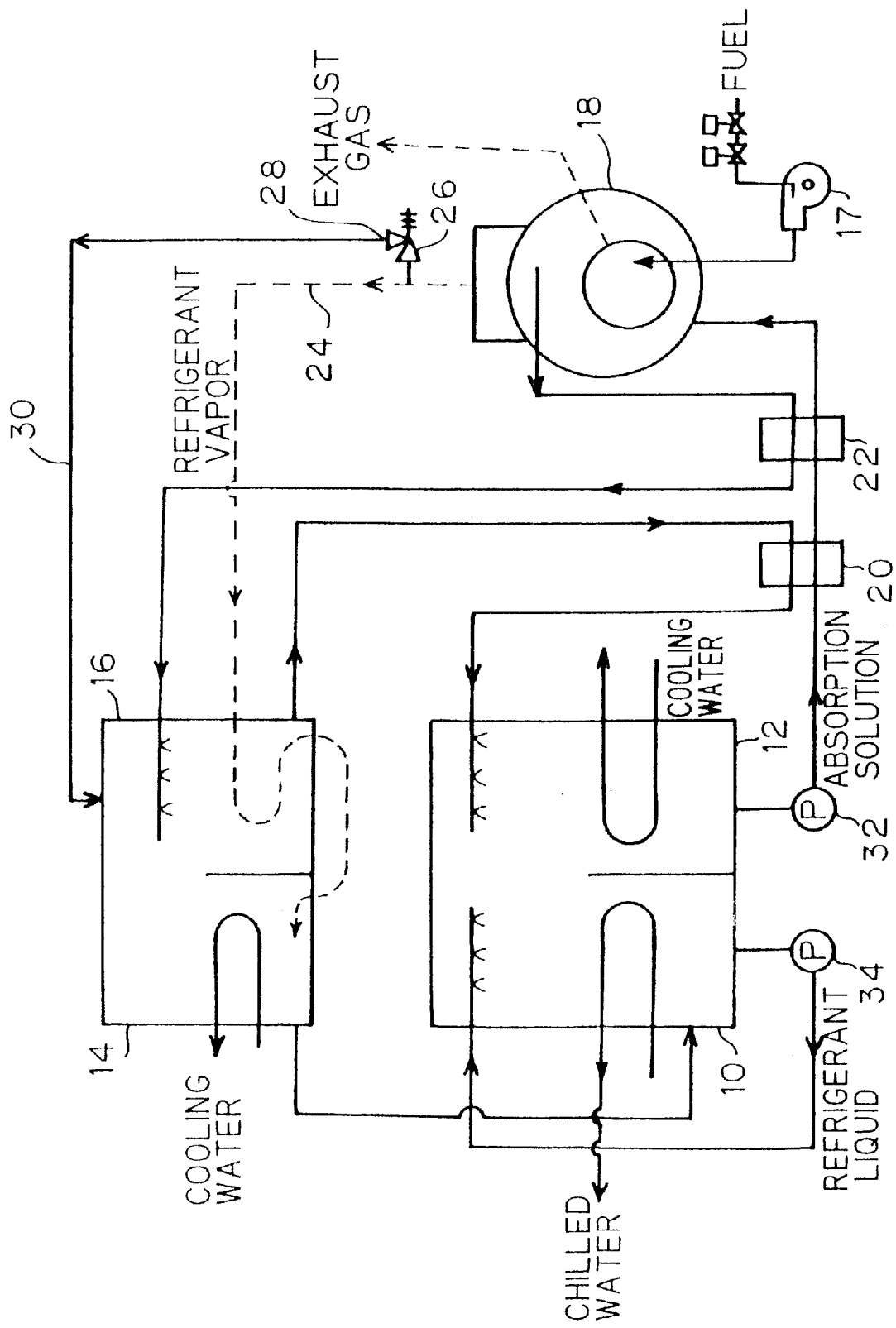
FIG. 1 is a schematic flow diagram of an absorption chiller having a safety device in accordance with the first embodiment of the present invention.

Referring now to the drawings, some of the preferred embodiments of the invention are described in detail below.

FIG. 1 shows a double-effect absorption chiller having a safety device in accordance with the first embodiment of the present invention. As shown in FIG. 1, the double-effect absorption chiller comprises an evaporator 10, absorber 12, condenser 14, low temperature regenerator 16, high temperature regenerator 18 having a combustion device 17 to heat and concentrate an absorption solution by directly burning the fuel such as gas or oil, low temperature heat exchanger 20, high temperature heat exchanger 22, solution circulating pump, and solution piping and refrigerant piping for the connection of these devices.

Pressure rise preventing means 26 such as a safety valve, rapture disk and breakable plate (as an example, a safety valve is shown in FIG. 1; hereinafter, it is shown as safety valve 26 as needed) is connected to the refrigerant piping 24 from high temperature regenerator 18, and discharge opening 28 of the safety valve 26 is connected to a low temperature regenerator 16 through pressure relief piping 30.

In a double-effect absorption chiller having a construction as described, the absorption solution (rare solution, e.g. lithium bromide solution) in the absorber 12 is delivered by a solution pump (low temperature pump) 32 to the high temperature regenerator 18 through the low temperature heat exchanger 20 and high temperature heat exchanger 22, then the fuel is burnt at the combustion device 17 and the absorption solution is heated by the generated combustion gas and concentrated. Incidentally, as the heating source for high temperature regenerator 18, it is possible to use steam or exhaust gas from heat engines such as a gas engine, gas turbine, etc. instead of installing a combustion device to utilize the fuel combustion heat.

The absorption solution from high temperature regenerator 18 is sent to the low temperature regenerator 16 via high temperature heat exchanger 22, where the solution is heated and concentrated by the refrigerant vapor (e.g. water vapor) from the high temperature regenerator 18. Subsequently, the absorption solution from the low temperature regenerator 16 is fed to the low temperature heat exchanger 20. After that, the solution is introduced into the absorber 12 and is indirectly cooled by cooling water and also mixed with refrigerant solution (e.g. water) from the evaporator 10 to become a rare solution.

On the other hand, the refrigerant vapor from the high temperature regenerator 18 enters the low temperature regenerator 16 where the vapor heats the absorption solution to become condensed and liquefied and then enters the condenser 14. The refrigerant vapor generated as a result of concentration of the absorption solution in the low temperature regenerator 16 enters the condenser 14 and is indirectly cooled by the cooling water to become condensed. After that, the refrigerant solution (liquid) (e.g. water) enters the evaporator 10, then the condensed refrigerant solution is sprinkled by refrigerant pump 34 to the heat transfer pipe (with water circulated) of evaporator 10, thereby obtaining chilled water.

Even when the pressure in the high temperature regenerator 18 increases during operation, causing the safety valve 26 to operate, the refrigerant vapor and absorption solution from the high temperature regenerator 18 will be discharged to the low temperature regenerator 16 designed to generally maintain a vacuum therein during operation. Therefore, it is possible to assure safety, preventing open-to-atmosphere trouble, and to quickly and readily perform the restoration after safety assurance.

The low pressure units such as the low temperature regenerator 16 are designed to maintain a great amount of vacuum at all times by means of a vacuum pump or automatic bleeder in order to maintain the performance during the cooling operation. Also, during suspension of the operation, heating is not performed at the high temperature regenerator 18, then the low temperature and high temperature sides are at the same pressure level and generally maintained under a vacuum so that the safety valve 26 will never be activated.

In the present embodiment, the safety device comprises safety valve 26 and pressure relief piping 30 which connects discharge opening 28 of the safety valve to the low pressure units such as low temperature regenerator 16.

The above description of the embodiment refers to a series flow type double-effect absorption chiller connected and disposed in a manner such that the absorption solution, pumped up from the absorber 12 to the high temperature regenerator 18, flows to the low temperature regenerator 16, but the embodiment described is also applicable to a reverse flow type double-effect absorption chiller connected and disposed in a manner such that the absorption solution is pumped up from the absorber to the low temperature regenerator and further up to the high temperature regenerator, and also applicable to a parallel flow type double-effect absorption chiller connected and disposed in a manner such that the absorption solution is pumped up from the absorber simultaneously to the high temperature regenerator and the low temperature regenerator.

Also, it will be appreciated that the embodiment is naturally applicable to an absorption chiller-heater instead of an absorption chiller. In this case, there is provided a chiller/heater changeover valve (not shown) between the refrigerant piping of the low temperature regenerator and the evaporator, and the changeover valve is closed during chiller operation, while the valve is opened during heater operation, thereby discontinuing the cooling water supply to the absorber and condenser. Incidentally, it is also possible to use a once-through boiler in place of the high temperature regenerator.

Figure 2:
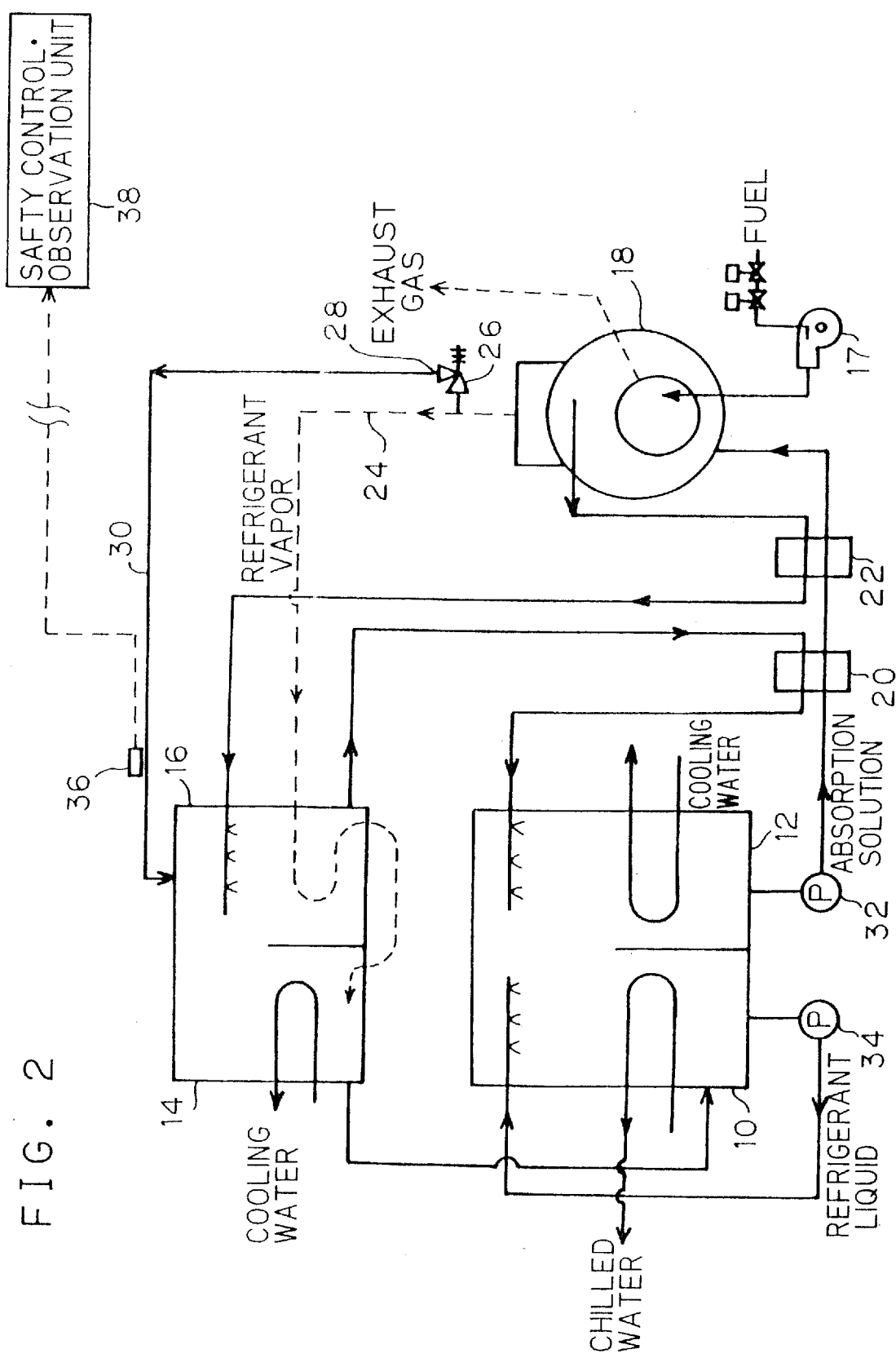
FIG. 2 is a schematic flow diagram of an absorption chiller having a safety device in accordance with the second embodiment of the present invention.

FIG. 2 shows a double-effect absorption chiller having a safety device in accordance with the second embodiment of the present invention. This embodiment has a construction such that there is provided a pressure rise preventing means for the high pressure side, for example, a temperature measuring device (e.g. a temperature sensor) or a pressure measuring device (e.g. a pressure sensor) in pressure relief piping 30 that connects discharge opening 28 of safety valve 26 to low pressure units, and the temperature or pressure sensor 36 is electrically connected to a safety control monitor unit 38 of the exterior (outside the system), whereby the temperature change or pressure change is detected as the safety valve 26 of the high pressure side is activated in case of refrigerant vapor and absorption solution outflow, then the detected signal is transmitted through an electrically built-in safety circuit to stop the combustion at the high temperature regenerator 18 or to stop the heating source supply to discontinue the operation, and at the same time to inform the abnormality to the outside.

In this embodiment, when the pressure in the high temperature regenerator 18 increases causing the safety valve 26 to be activated, since the discharge opening 28 is connected to the low pressure side via the pressure relief piping 30, it is possible to discharge the pressure, assuring safety and also preventing open-to-atmosphere trouble, and to quickly and readily perform the restoration after safety assurance, and also to stop the operation and to inform the abnormality to the outside.

In this embodiment, the safety device comprises safety valve 26, pressure relief piping 30 that connects discharge opening 28 of the safety valve to the low pressure units such as low temperature regenerator 16, temperature sensor or pressure sensor 36, and a safety control or monitor unit 38 connected to the temperature sensor or pressure sensor 36. The other construction and operation are the same as in the first embodiment.

Figure 3:
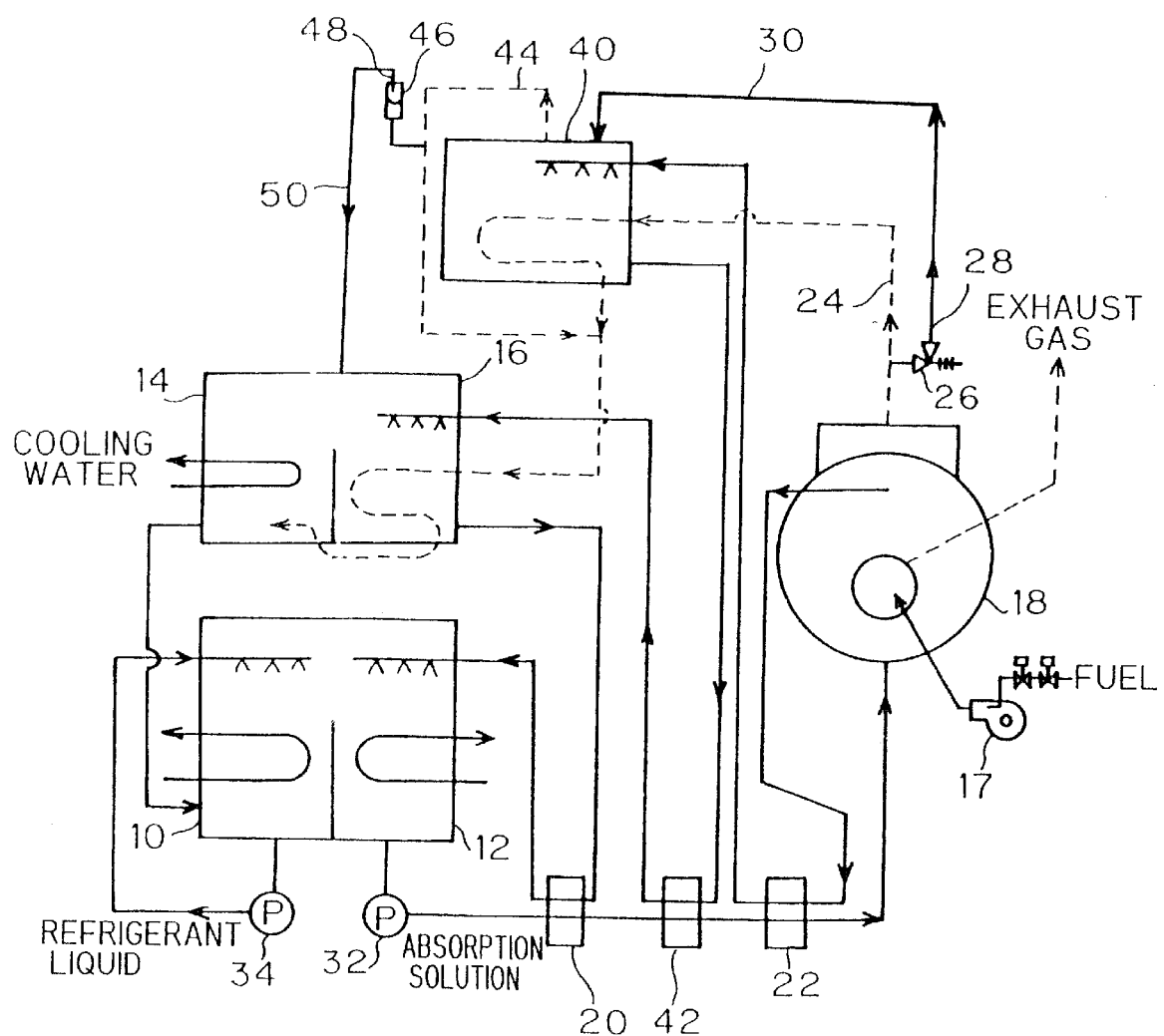
FIG. 3 is a schematic flow diagram of an absorption chiller having a safety device in accordance with the third embodiment of the present invention.

FIG. 3 shows a multiple-effect absorption chiller in accordance with the third embodiment of the present invention. FIG. 3 is a triple-effect absorption chiller as an example. As shown in FIG. 3, the triple-effect absorption chiller comprises an evaporator 10, absorber 12, condenser 14, low temperature regenerator 16, medium temperature regenerator 40, high temperature regenerator 18 having combustion device 17 to heat and concentrate the absorption solution by directly burning the fuel such as gas or oil, low temperature heat exchanger 20, medium temperature heat exchange 42, high temperature heat exchanger 22, solution circulating pump, and solution piping and refrigerant piping for the connection of these devices.

Pressure rise preventing means 26 such as a safety valve, rapture disk and breakable plate (as an example, a safety valve is shown in FIG. 3; hereinafter, it is shown as safety valve 26 as needed) is connected to the refrigerant vapor piping 24 from high temperature regenerator 18, and discharge opening 28 of the safety valve 26 is connected to medium temperature regenerator 40 through pressure relief piping 30.

Pressure rise preventing means 46 such as a safety valve, rapture disk and breakable plate (as an example, a rapture disk is shown in FIG. 3; hereinafter, it is shown as rapture disk 46 as needed) is connected to refrigerant vapor piping 44 from medium temperature regenerator 40, and discharge opening 48 of the rapture disk 46 is connected to low temperature regenerator 16 through pressure relief piping 50.

In a triple-effect absorption chiller having a construction as described, the absorption solution (rare solution, e.g. lithium bromide solution) in the absorber 12 is delivered by solution pump (low temperature pump) 32 to the high temperature regenerator 18 through the low temperature heat exchanger 20, medium temperature heat exchanger 42 and high temperature heat exchanger 22, then the fuel is burnt at the combustion device 17 and the absorption solution is heated by the generated combustion gas and concentrated. Incidentally, as the heating source for high temperature regenerator 18, it is possible to use steam or exhaust gas from heat engines such as a gas engine, gas turbine, etc. instead of installing a combustion device to utilize the fuel combustion heat.

The absorption solution from the high temperature regenerator 18 is sent to the medium temperature regenerator 40 via high temperature heat exchanger 22, where the solution is heated and concentrated by the refrigerant vapor (e.g. water vapor) from high temperature regenerator 18. Subsequently, the absorption solution from medium temperature regenerator 40 is fed to the medium temperature heat exchanger 42. After that, the solution is introduced into the low temperature regenerator 16 where it is heated and concentrated by the refrigerant vapor from the medium regenerator 40. The absorption solution from low temperature regenerator 16 is fed to the low temperature heat exchanger 20. After that, the solution is introduced into the absorber 12 and is indirectly cooled by cooling water and also mixed with refrigerant solution (e.g. water) from the evaporator 10 to become a rare solution.

On the other hand, the refrigerant vapor from the high temperature regenerator 18 enters the medium temperature regenerator 40 where the refrigerant vapor heats the absorption solution to become partially condensed and liquefied and then enters the low temperature regenerator 16. The refrigerant vapor generated as a result of concentration of the absorption solution in the medium temperature regenerator 40 is introduced into low temperature regenerator 16 through refrigerant vapor piping 44.

The refrigerant vapor generated as a result of concentration of the absorption solution in the low temperature regenerator 16 enters the condenser 14 and is indirectly cooled by the cooling water to become condensed. After that, the refrigerant solution (e.g. water) enters the evaporator 10, then the condensed refrigerant solution is sprinkled by refrigerant pump 34 to the heat transfer pipe (with water circulated) of evaporator 10, thereby obtaining chilled water.

Even when the pressure in the high temperature regenerator 18 increases during operation, causing the safety valve 26 to operate, the refrigerant vapor and absorption solution from the high temperature regenerator 18 will be discharged to the medium temperature regenerator 40 designed so as to generally maintain a vacuum therein during operation. Thus, it will be appreciated that it is possible to assure safety, preventing open-to-atmosphere trouble, and to quickly and readily perform the restoration after safety assurance.

Also, when the pressure in medium temperature regenerator 40 increases during operation causing the rapture disk 46 to operate, the refrigerant vapor and absorption solution from medium regenerator 40 will be discharged to low temperature regenerator 16 designed so as to generally maintain a vacuum therein during operation. Thus, it will be appreciated that it is possible to assure safety, preventing open-to-atmosphere trouble, and to quickly and readily perform the restoration after safety assurance.

In this way, it is possible to use the interior volume of the shell for pressure reduction purpose by connecting the discharge opening of safety valve 26 or rapture disk 46 to the low pressure units in sequence via the pressure relief piping. Also, it is desirable to make the proper use of the pressure rise preventing means, for example, a safety valve for the high pressure side and rapture disk for the low pressure side, making the most of their features in accordance with each pressure level.

The low pressure units such as low temperature regenerator 16 are designed to maintain a great amount of vacuum at all times by means of a vacuum pump or automatic bleeder in order to maintain the performance during the cooling operation. Also, during suspension of the operation, heating is not performed at the high temperature regenerator 18, then the low temperature and high temperature sides are at the same pressure level and generally maintained under a vacuum so that the safety valve 26 will never be activated.

In the present embodiment, the safety device comprises safety valve 26, and pressure relief piping 30 which connects discharge opening 28 of the safety valve to medium temperature regenerator 40, rapture disk 46, and pressure relief piping 50 which connects discharge opening 48 of the rapture disk to low pressure units such as low temperature regenerator 16.

The above description of the embodiment refers to a series flow type triple-effect absorption chiller connected and disposed in a manner such that the absorption solution pumped up from the absorber 12 to the high temperature regenerator 18 flows to the low temperature regenerator 16 through the medium temperature regenerator 40, but the embodiment described is also applicable to a reverse flow type triple-effect absorption chiller connected and disposed in a manner such that the absorption solution is pumped up from the absorber to the low temperature regenerator and further up to the high temperature regenerator through the medium temperature regenerator, and also to a parallel flow type triple-effect absorption chiller connected and disposed in a manner such that the absorption solution is pumped up from the absorber simultaneously to the high temperature regenerator, medium temperature regenerator and low temperature regenerator. Also, the embodiment is applicable to a quadruple-effect or other multiple-effect absorption chiller.

Also, it will be appreciated that the embodiment is naturally applicable to an absorption chiller-heater instead of an absorption chiller. In this case, there is provided a chiller/heater changeover valve (not shown) between the refrigerant piping of the low temperature regenerator and/or medium temperature regenerator and the evaporator, and the changeover valve is closed during chiller operation, while the valve is opened during heater operation, thereby discontinuing the cooling water supply to the absorber and condenser. Incidentally, it is also possible to use a once-through boiler in place of the high temperature regenerator.

Figure 4:
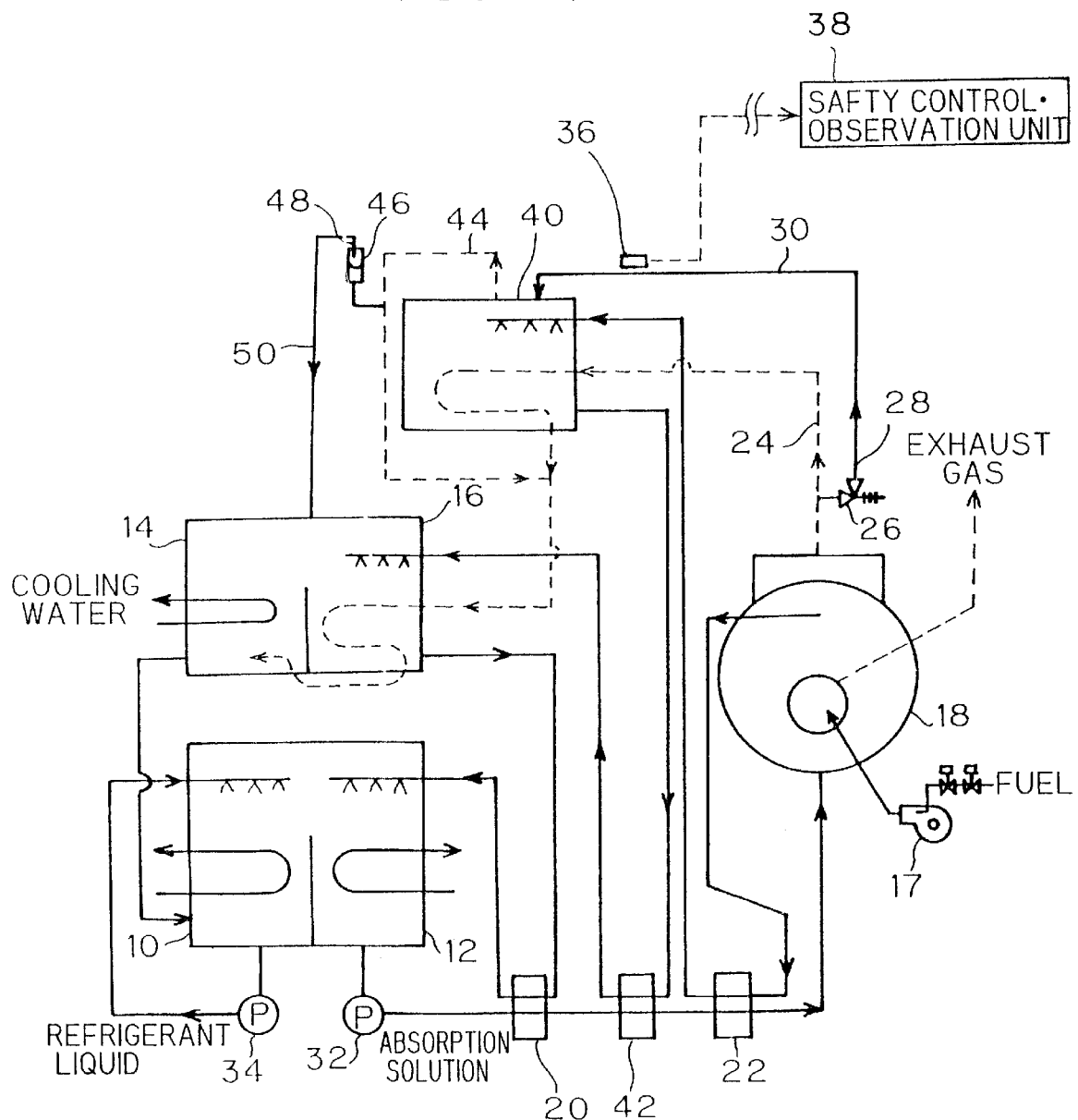
FIG. 4 is a schematic flow diagram of an absorption chiller having a safety device in accordance with a fourth embodiment of the present invention.

FIG. 4 shows a triple-effect absorption chiller having a safety device in accordance with the fourth embodiment of the present invention. This embodiment has a construction such that there is provided a pressure rise preventing means for the high pressure side, for example, a temperature measuring device (e.g. a temperature sensor) or a pressure measuring device (e.g. a pressure sensor) in pressure relief piping 30 that connects discharge opening 28 of safety valve 26 to low pressure units, and the temperature or pressure sensor 36 is electrically connected to a safety control monitor unit 38 of the exterior (outside the system), whereby the temperature change or pressure change is detected as the safety valve 26 of the high pressure side is activated in case of refrigerant vapor and absorption solution outflow, then the detected signal is transmitted through an electrically built-in safety circuit to stop the combustion at the high temperature regenerator 18 or to stop the heating source supply to discontinue the operation and at the same time to inform the abnormality to the outside.

In this embodiment, when the pressure in the high temperature regenerator 18 increases causing the safety valve 26 to operate, since the discharge opening 28 is connected to the low pressure side via the pressure relief piping 30, it is possible to discharge the pressure, assuring safety and also preventing open-to-atmosphere trouble, and to quickly and readily perform the restoration after safety assurance, and also to stop the operation and to inform the abnormality to the outside.

In this embodiment, the safety device comprises safety valve 26, pressure relief piping 30 that connects discharge opening 28 of the safety valve to the low pressure units such as medium temperature regenerator 40, temperature sensor or pressure sensor 36, safety control monitor unit 38 connected to the temperature sensor or pressure sensor 36, rapture disk 46, and pressure relief piping 50 that connects discharge opening 48 of the rapture disk to low pressure units such as low temperature regenerator 16. The other construction and operation are the same as in the third embodiment.

Figure 5:
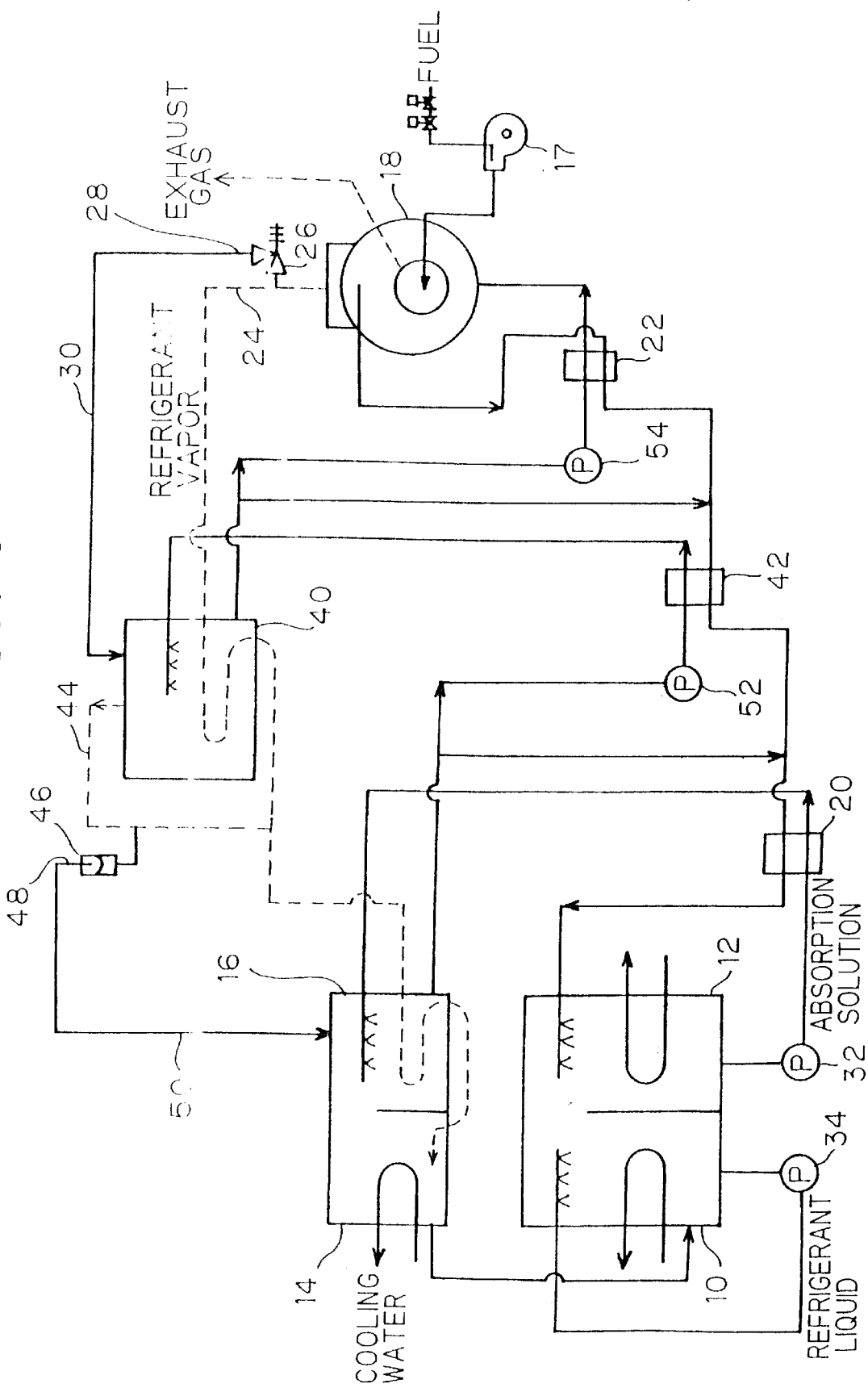
FIG. 5 is a schematic flow diagram of a reverse flow type absorption chiller having a safety device in accordance with a fifth embodiment of the present invention.
Figure 6:
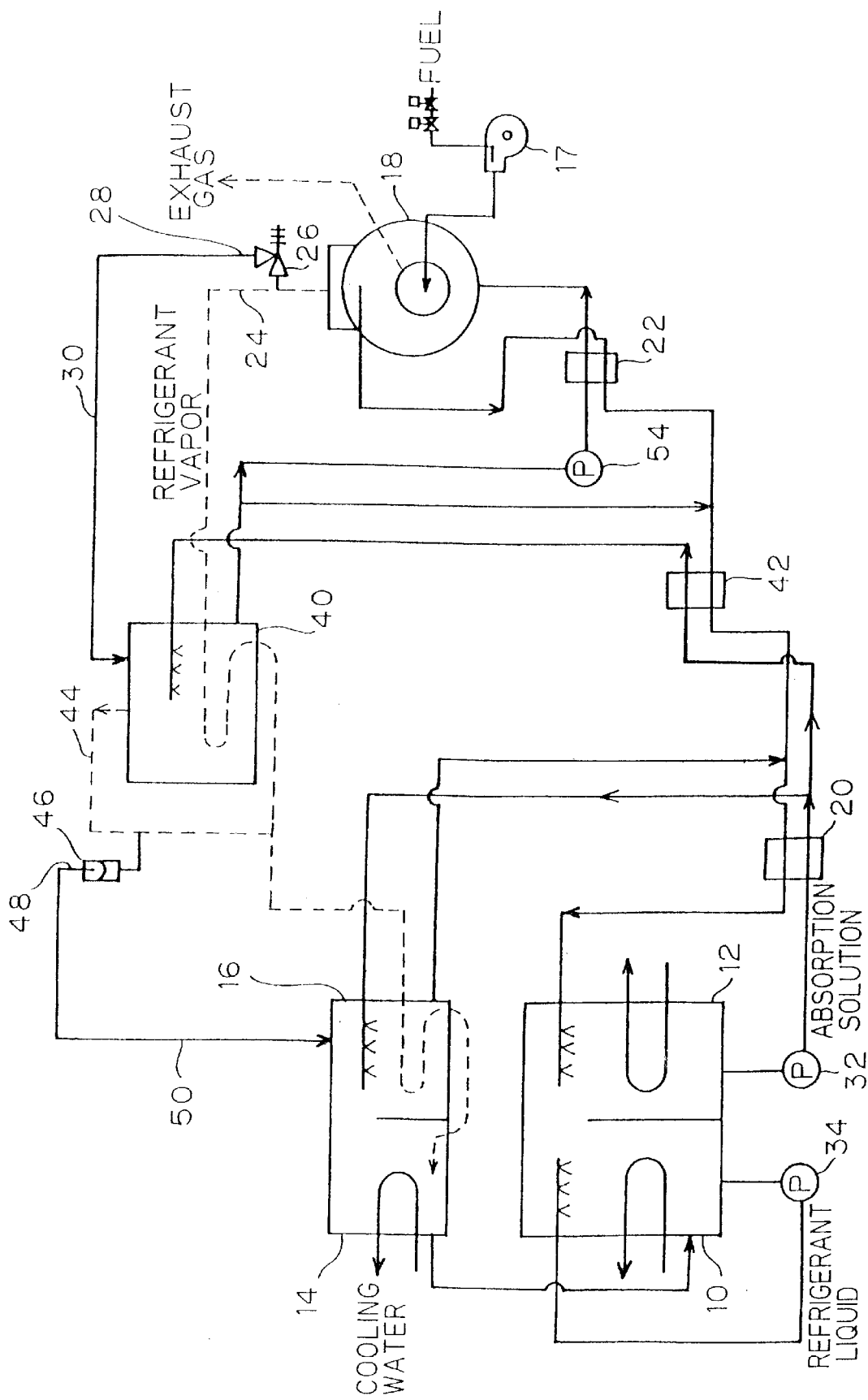
FIG. 6 is a schematic flow diagram of a parallel flow type absorption chiller having a safety device in accordance with the fifth embodiment of the present invention.

FIG. 5 shows a triple-effect absorption chiller having a safety device in accordance with the fifth embodiment of the present invention. This embodiment is applicable to a reverse flow type absorption chiller wherein each device and piping are disposed and connected in a manner such that the absorption solution from absorber 12, pumped up to low temperature regenerator 16, is fed by solution pump 52 to medium temperature regenerator 40, and further the solution is supplied by solution pump 54 to high temperature regenerator 18. As shown in FIG. 6, the embodiment is also applicable to what is called parallel flow type absorption chiller wherein the absorption solution from absorber 12 flows in parallel with low temperature regenerator 16 and medium temperature regenerator 40. The other construction and operation are the same as in the third embodiment.

Figure 7:
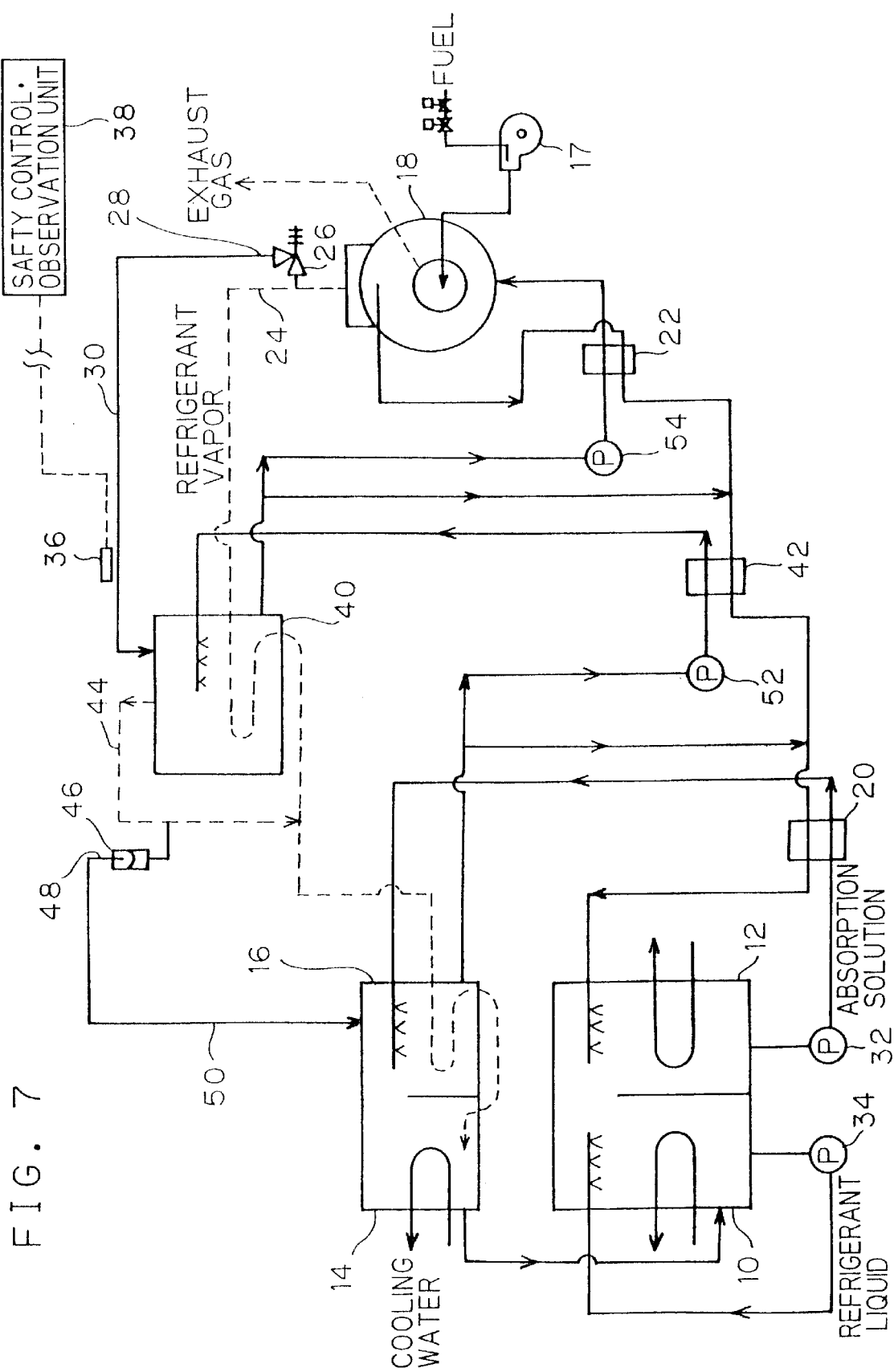
FIG. 7 is a schematic flow diagram of a reverse flow type absorption chiller having a safety device in accordance with the sixth embodiment of the present invention.
Figure 8:
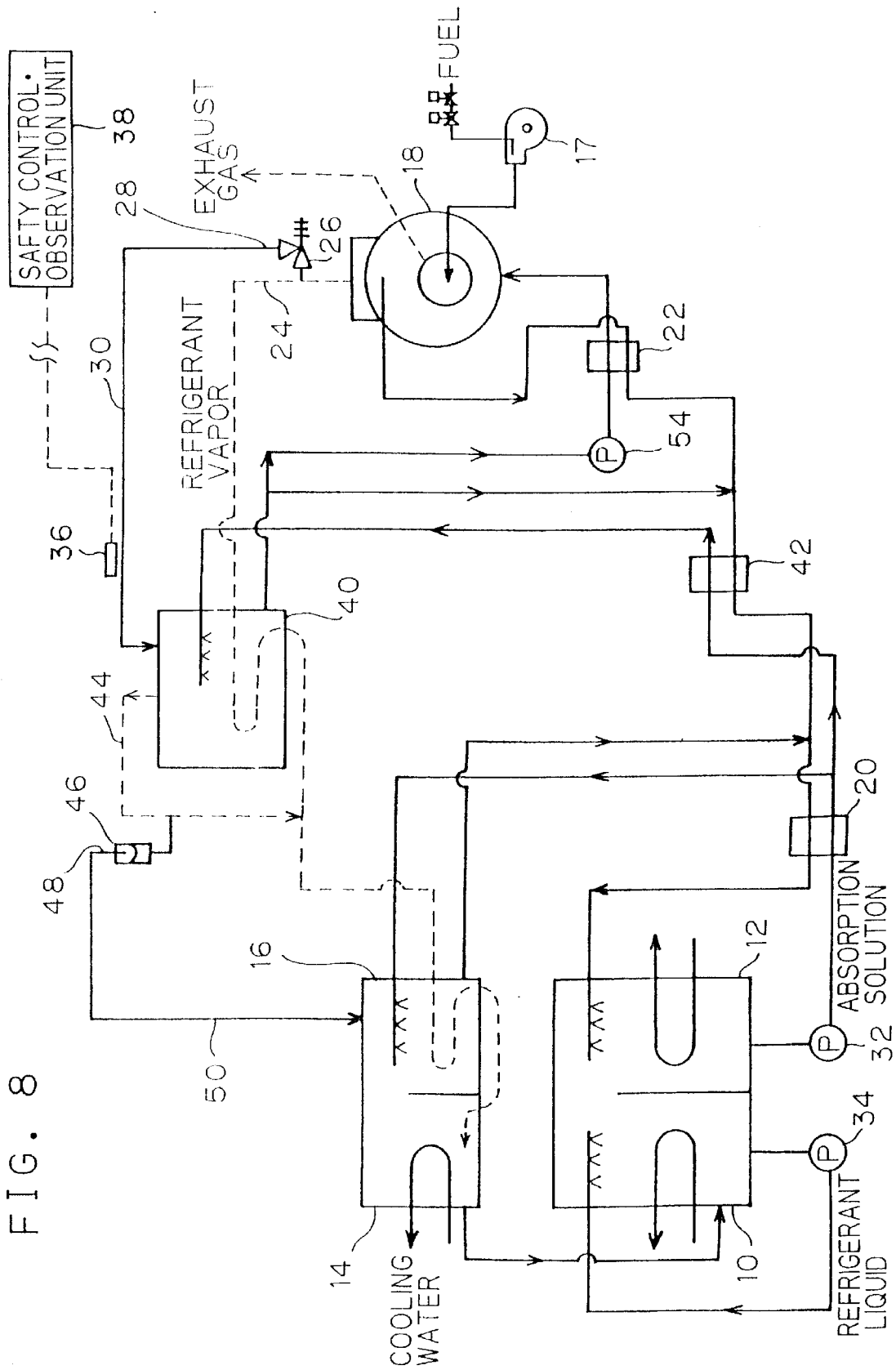
FIG. 8 is a schematic flow diagram of a parallel flow type absorption chiller having a safety device in accordance with the sixth embodiment of the present invention.

FIG. 7 shows a triple-effect absorption chiller having a safety device in accordance with the sixth embodiment of the present invention. This embodiment is applicable to a reverse flow type absorption chiller wherein each device and piping are disposed and connected in a manner such that the absorption solution from absorber 12, pumped up to low temperature regenerator 16, is fed by solution pump 52 to medium temperature regenerator 40, and further the solution is supplied by solution pump 54 to high temperature regenerator 18. As shown in FIG. 8, the embodiment is also applicable to what is called parallel flow type absorption chiller wherein the absorption solution from absorber 12 flows in parallel with low temperature regenerator 16 and medium temperature regenerator 40. The other construction and operation are the same as in the fourth embodiment.

Figure 9:
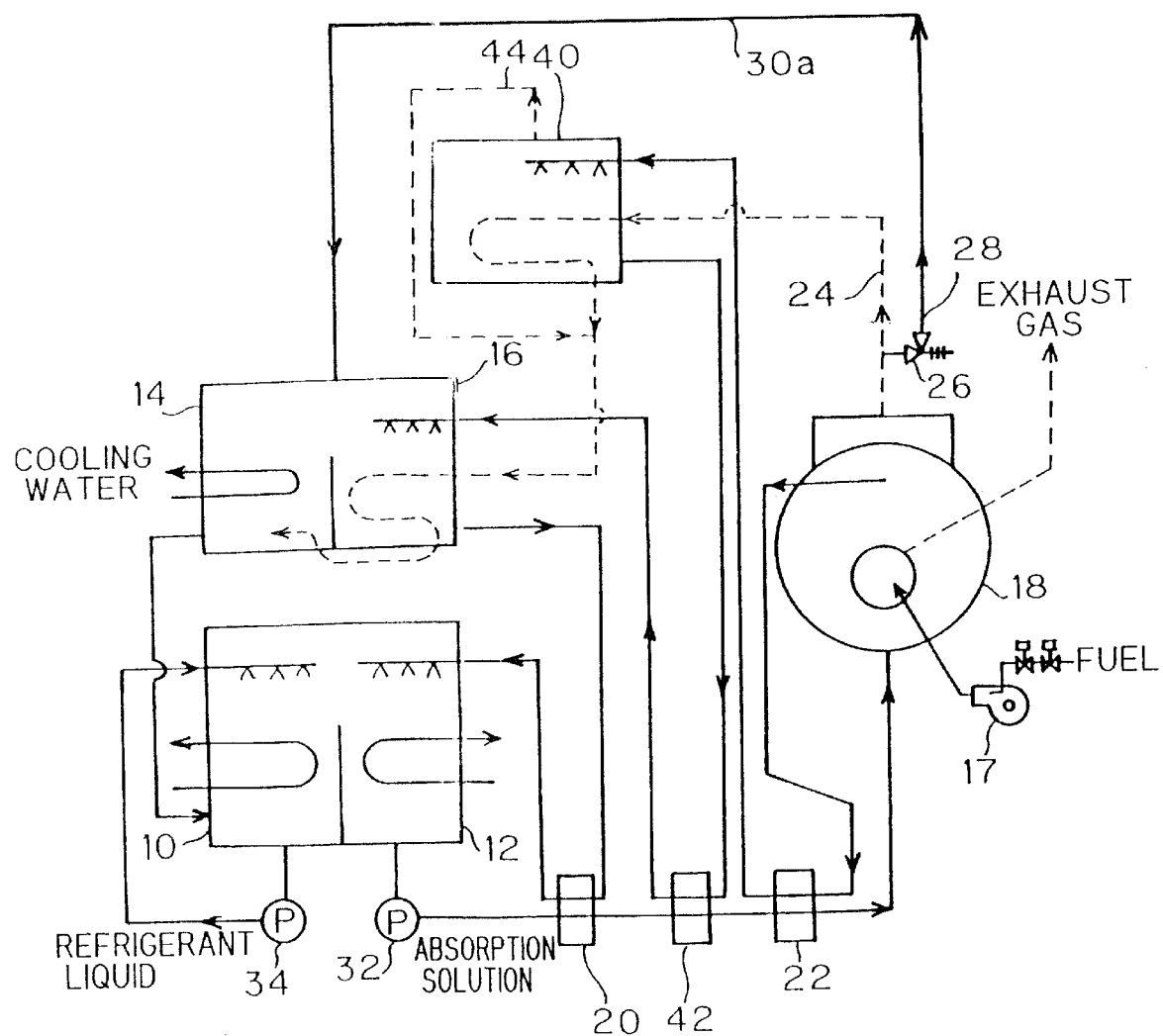
FIG. 9 is a schematic flow diagram of an absorption chiller having a safety device in accordance with the seventh embodiment of the present invention.

FIG. 9 shows a triple-effect absorption chiller having a safety device in accordance with the seventh embodiment of the present invention. This embodiment has a construction such that pressure relief piping 30a from high temperature regenerator 18 of a multiple-effect, for example, a triple-effect absorption chiller or chiller-heater is directly connected to low pressure units such as low temperature regenerator 16, thereby omitting the pressure relief piping from medium temperature regenerator 40. The other construction and operation are the same as in the third embodiment.

Figure 10:
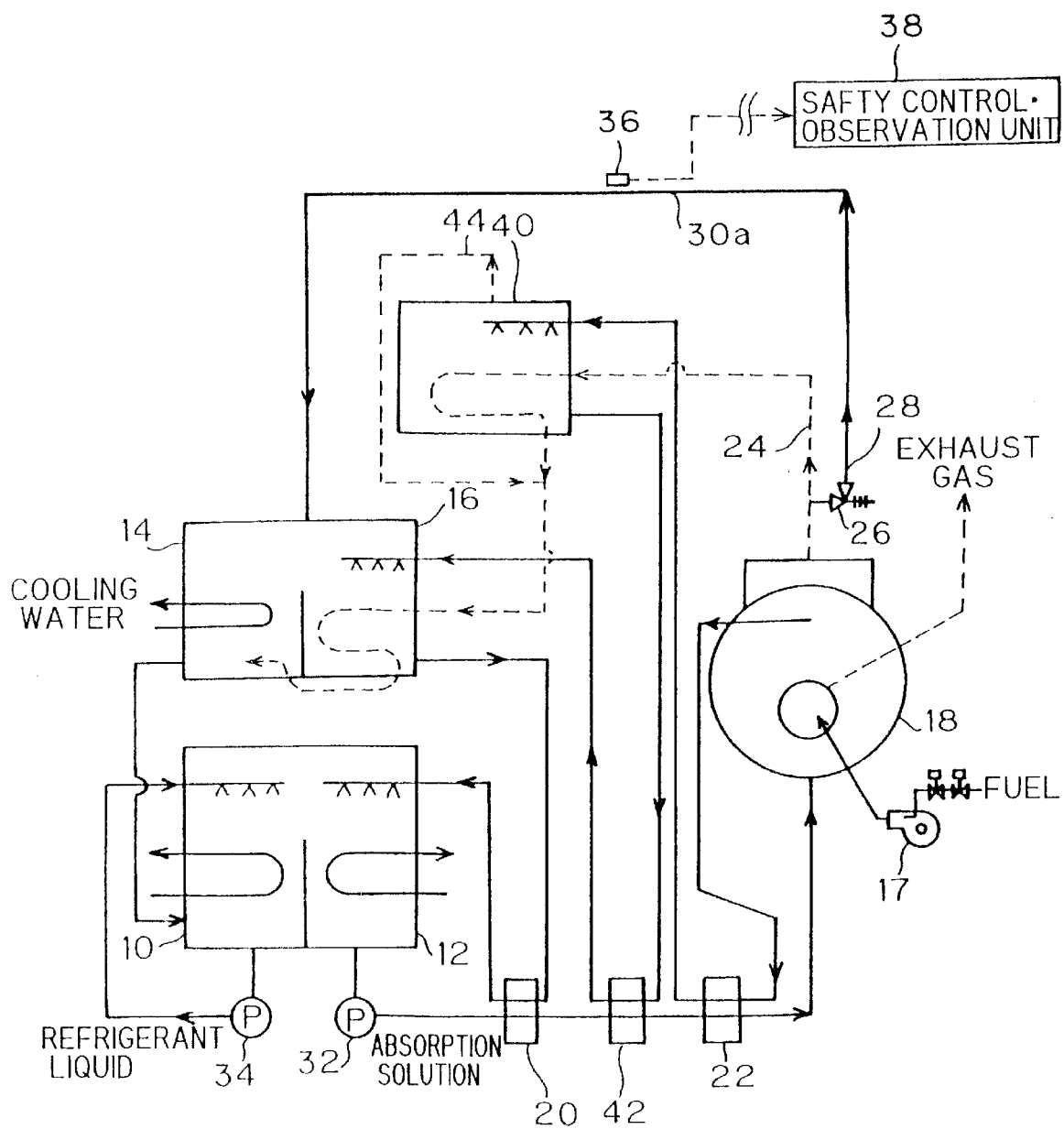
FIG. 10 is a schematic flow diagram of an absorption chiller having a safety device in accordance with the eighth embodiment of the present invention.

FIG. 10 shows a triple-effect absorption chiller having a safety device in accordance with the eighth embodiment of the present invention. This embodiment has a construction such that pressure relief piping 30a from high temperature regenerator 18 of a multiple-effect, for example, a triple-effect absorption chiller or chiller-heater is directly connected to low pressure units such as low temperature regenerator 16, thereby omitting the pressure relief piping from medium temperature regenerator 40. The other construction and operation are the same as in the fourth embodiment.

Figure 11:
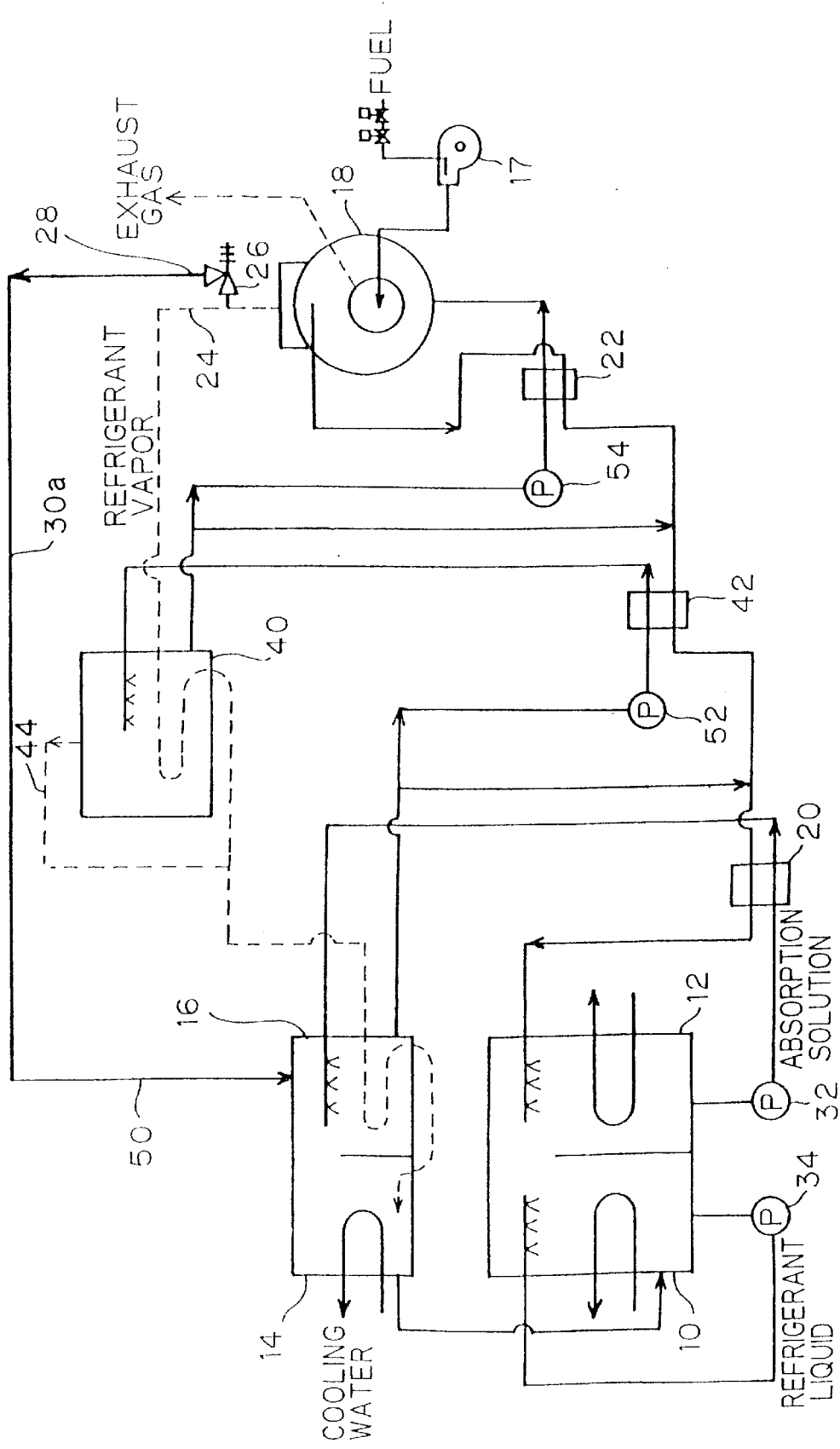
FIG. 11 is a schematic flow diagram of a reverse flow type absorption chiller having a safety device in accordance with the ninth embodiment of the present invention.
Figure 12:
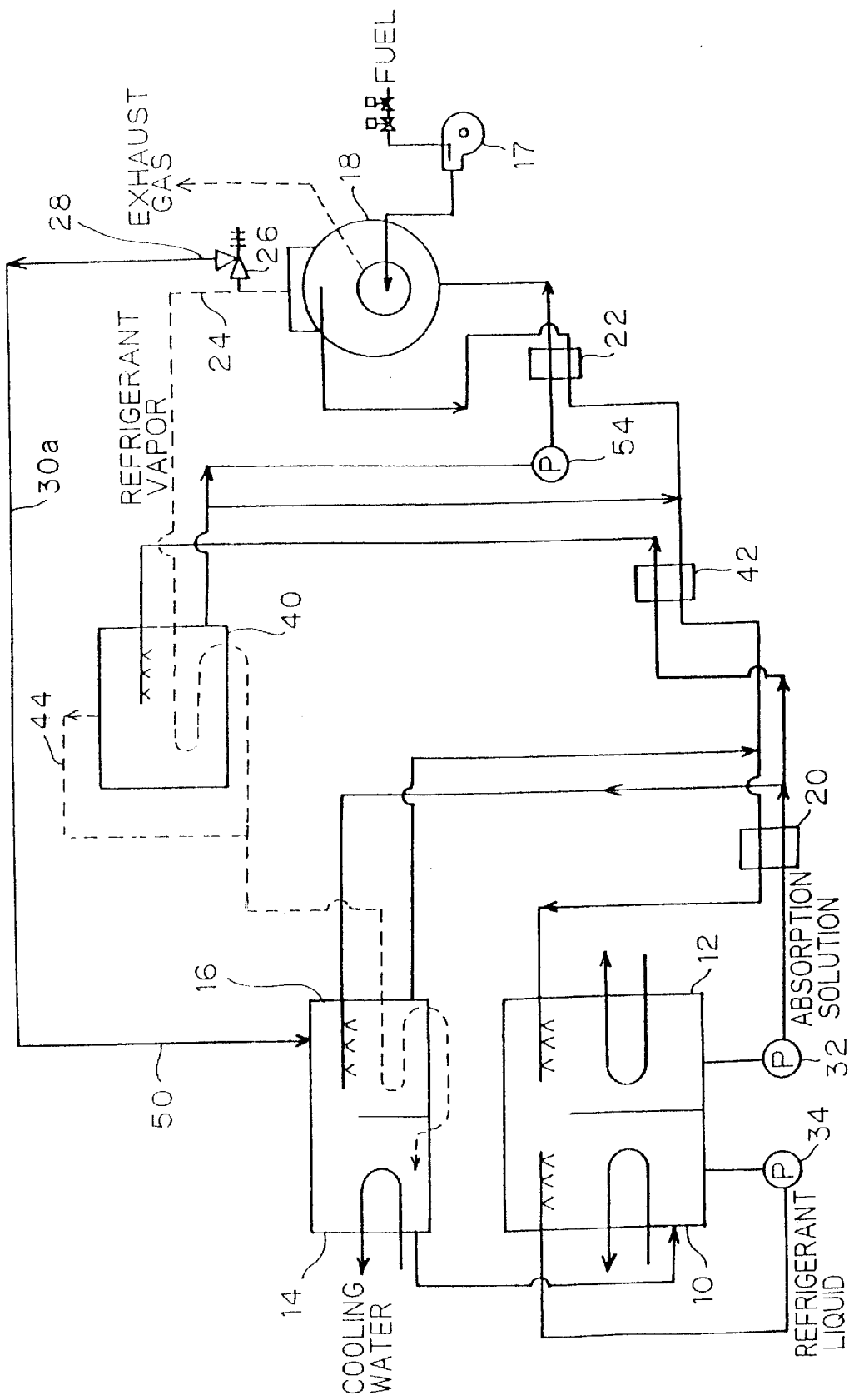
FIG. 12 is a schematic flow diagram of a parallel flow type absorption chiller having a safety device in accordance with the ninth embodiment of the present

FIG. 11 shows a triple-effect absorption chiller having a safety device in accordance with the ninth embodiment of the present invention. This embodiment has a construction such that pressure relief piping 30a from high temperature regenerator 18 of a multiple-effect, for example, a triple-effect absorption chiller or chiller-heater is directly connected to low pressure units such as low temperature regenerator 16, thereby omitting the pressure relief piping from medium temperature regenerator 40. As shown in FIG. 12, the embodiment is also applicable to what is called parallel flow type absorption chiller wherein the absorption solution from absorber 12 flows in parallel with low temperature regenerator 16 and medium temperature regenerator 40. The other construction and operation are the same as in the fifth embodiment.

Figure 13:
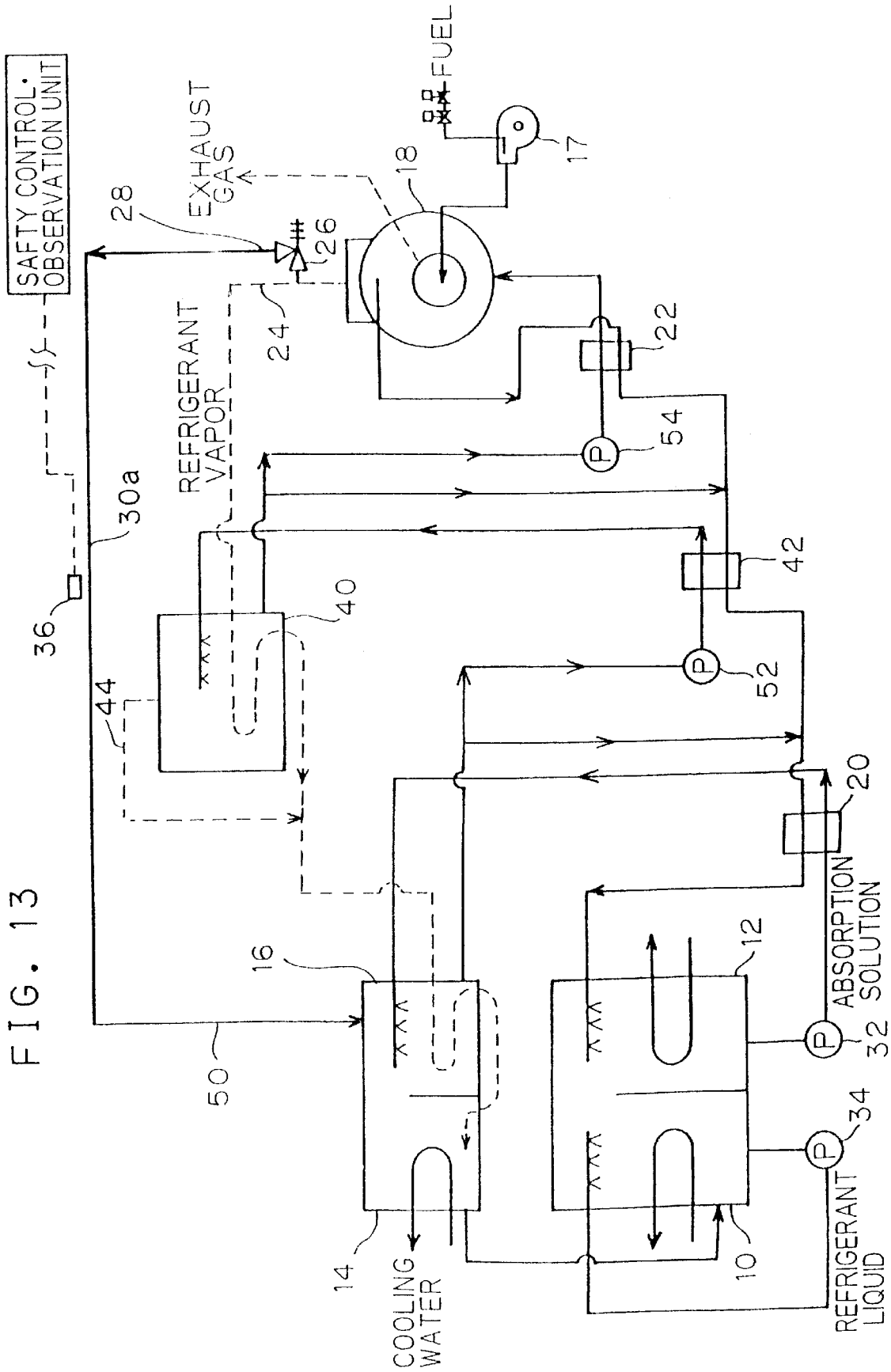
FIG. 13 is a schematic flow diagram of a reverse flow type absorption chiller having a safety device in accordance with the tenth embodiment of the present invention.
Figure 14:
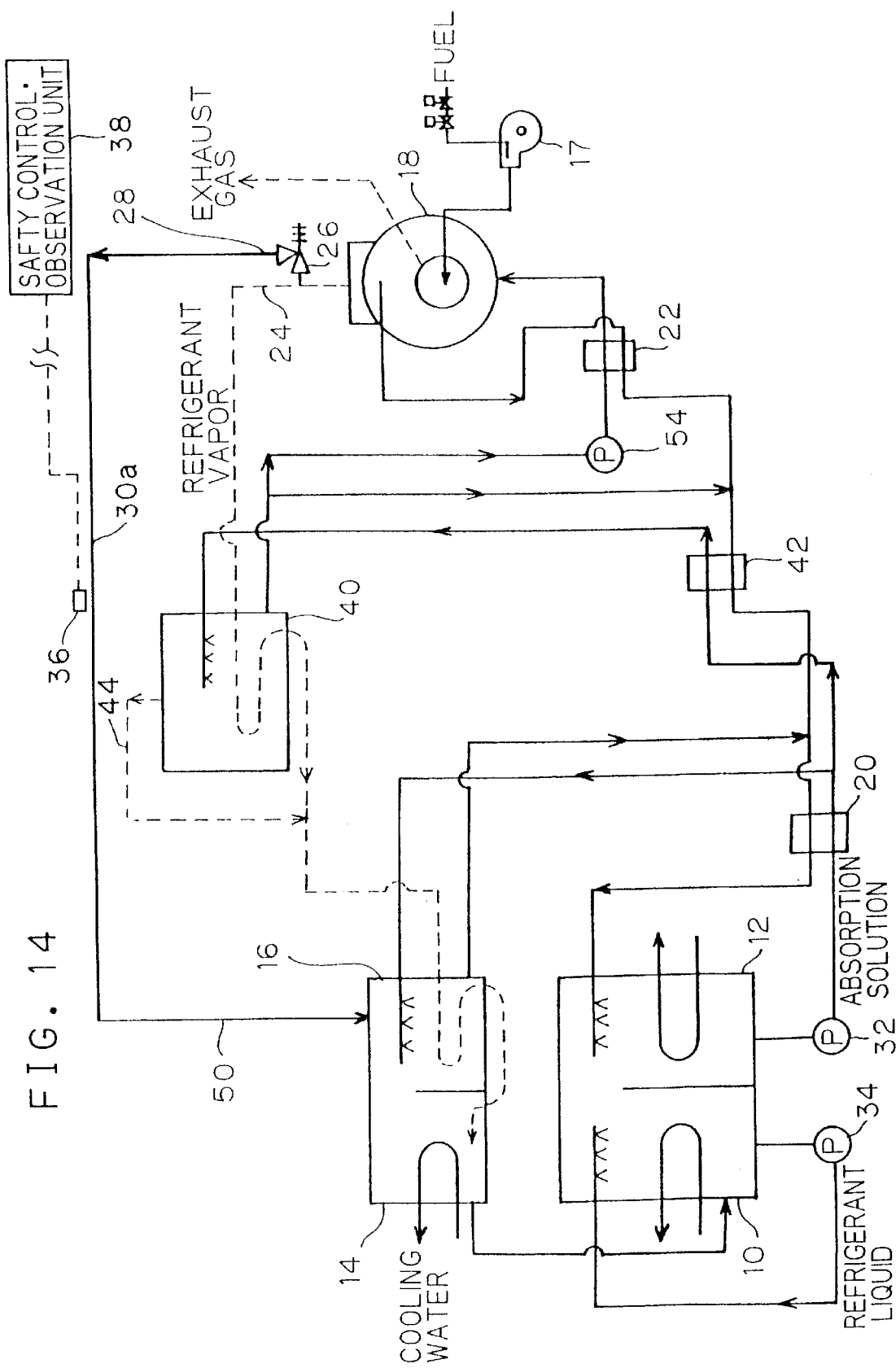
FIG. 14 is a schematic flow diagram of a parallel flow type absorption chiller having a safety device in accordance with the tenth embodiment of the present invention.

FIG. 13 shows a triple-effect absorption chiller having a safety device in accordance with the tenth embodiment of the present invention. This embodiment has a construction such that pressure relief piping 30a from high temperature regenerator 18 of a multiple-effect, for example, a triple-effect absorption chiller or chiller-heater is directly connected to low pressure units such as low temperature regenerator 16, thereby omitting the pressure relief piping from medium temperature regenerator 40. As shown in FIG. 14, the embodiment is also applicable to what is called parallel flow type absorption chiller wherein the absorption solution from absorber 12 flows in parallel with low temperature regenerator 16 and medium temperature regenerator 40. The other construction and operation are the same as in the sixth embodiment.

Figure 15:
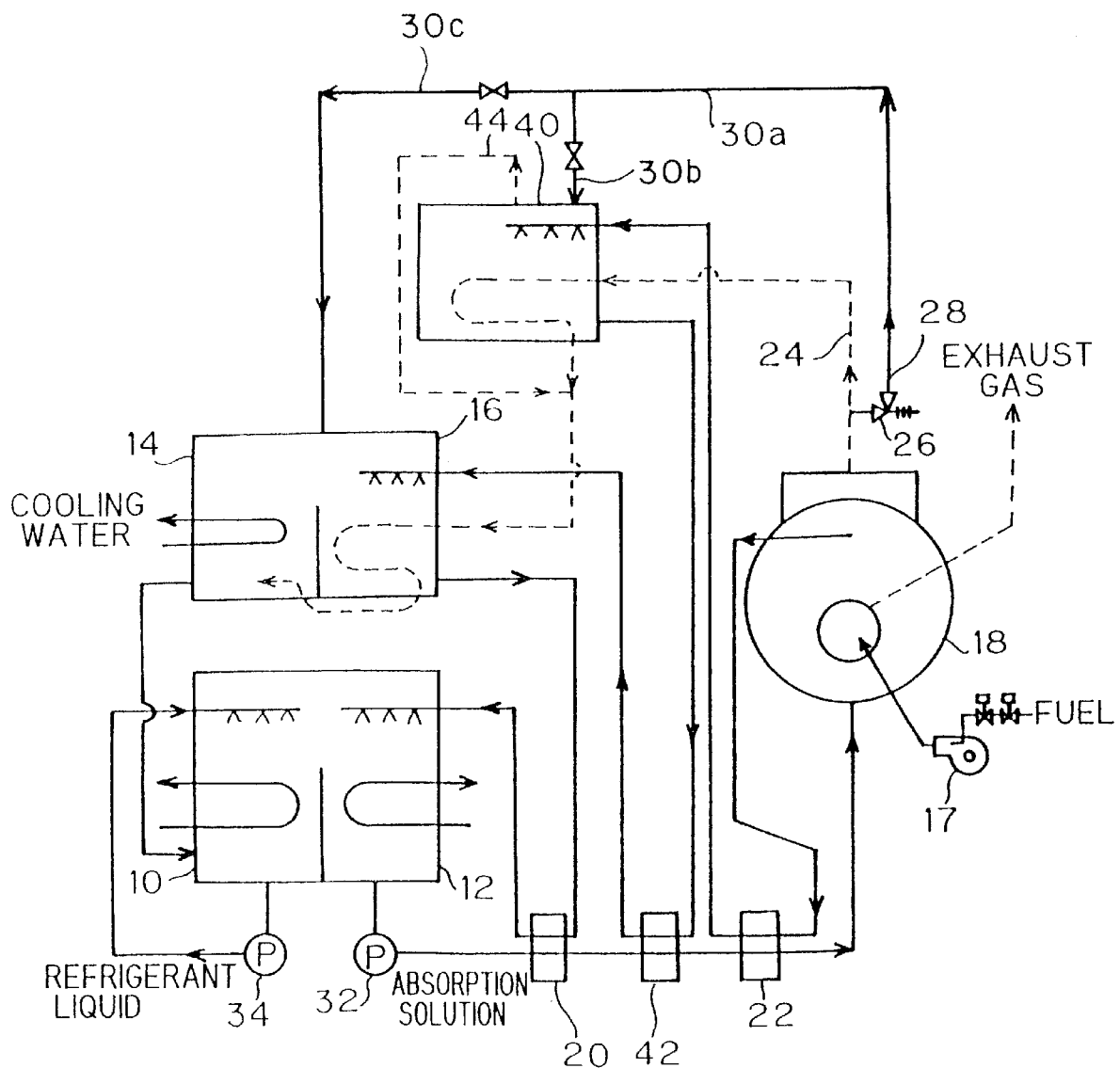
FIG. 15 is a schematic flow diagram of an absorption chiller having a safety device in accordance with the eleventh embodiment of the present invention.

FIG. 15 shows a triple-effect absorption chiller having a safety device in accordance with the eleventh embodiment of the present invention. This embodiment has a construction such that pressure relief piping 30a from high temperature regenerator 18 of a multiple-effect, for example, a triple-effect absorption chiller or chiller-heater is branched, and one of the branched pressure relief piping 30b is connected to medium temperature regenerator 40, and the other branched pressure relief piping 30c is connected to low pressure units such as low temperature regenerator 16 so that the refrigerant vapor and absorption solution may be discharged in parallel fashion not only from high temperature regenerator 18 to medium temperature regenerator 40 but also to low pressure units such as low temperature regenerator 16. The branched pressure relief piping 30b and 30c are designed to be provided with a valve or changed in pipe diameter in order to make the flow rate of vapor appropriate. The valve disposed in the piping 30b is required to have a function as a non-return valve which may prevent the counter-flow or bypassing from the medium temperature regenerator to the low temperature regenerator.

Figure 16:
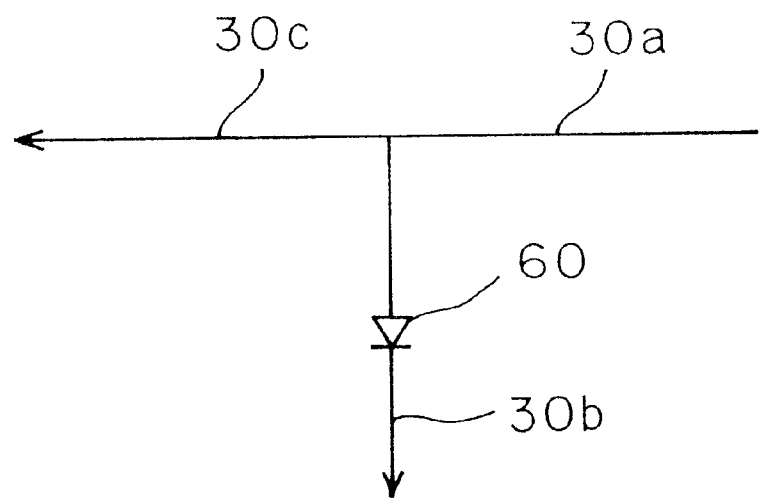
FIG. 16 is a schematic diagram showing an example of configuration around the pressure relief piping in FIG. 15.
Figure 17:
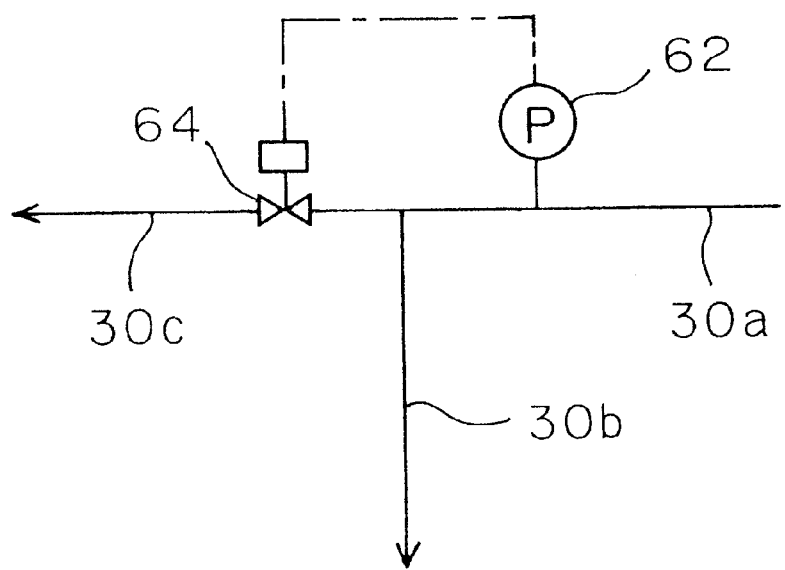
FIG. 17 is a schematic diagram showing another example of configuration around the pressure relief piping in FIG. 15.

For example, there is a possible construction such that, as shown in FIG. 16, non-return valve 60 is disposed in the branched pressure relief piping 30b to the medium temperature regenerator or, as shown in FIG. 17, pressure detector 62 is disposed in the pressure relief piping 30a before branching or pressure control valve (shut-off valve) 64 is disposed in the branched pressure relief piping 30c to the low temperature regenerator, thereby controlling the valve 64 according to the value detected by the pressure detector 62. The other construction and operation are the same as in the seventh embodiment.

Figure 18:
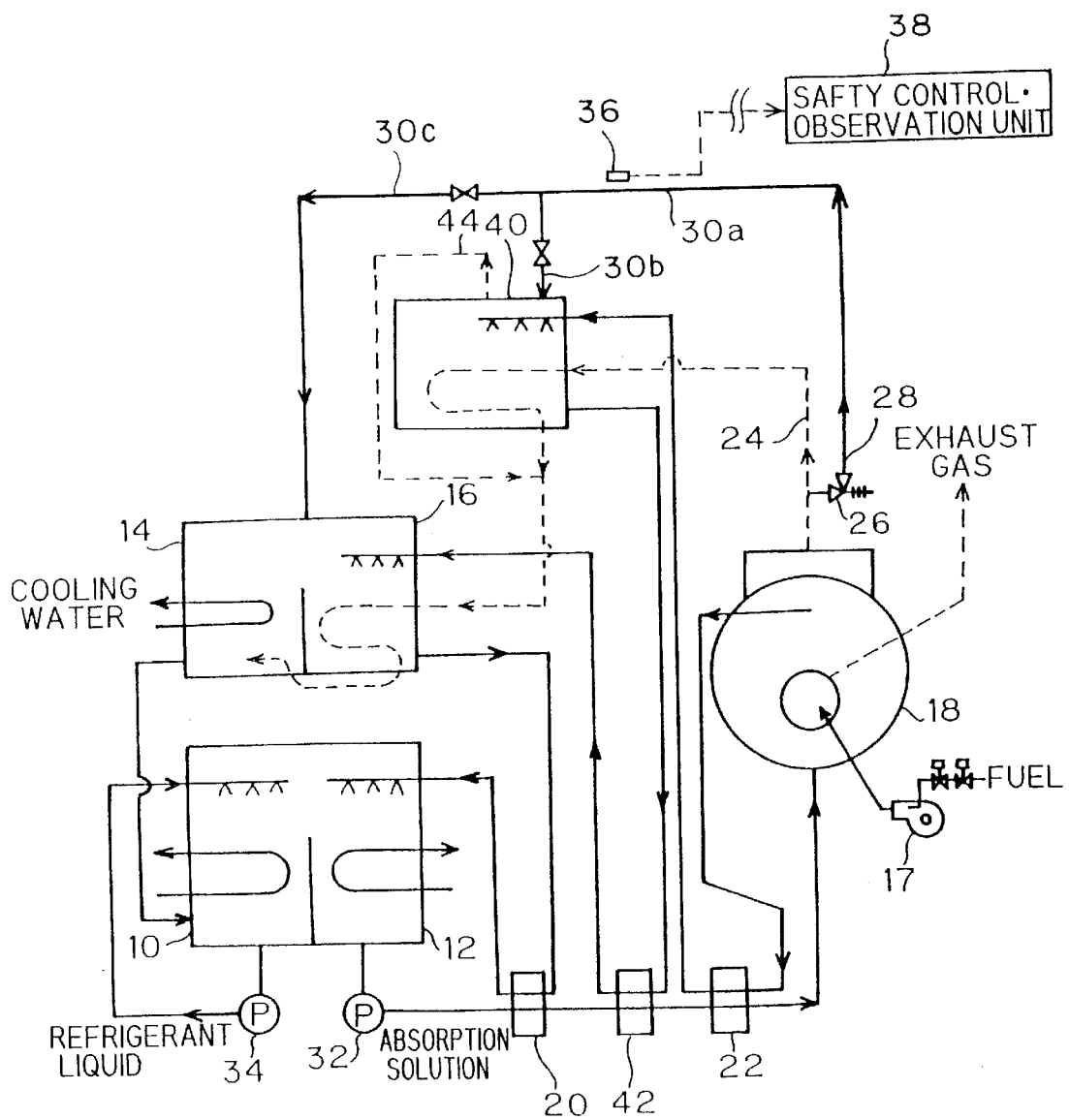
FIG. 18 is a schematic flow diagram of an absorption chiller having a safety device in accordance with the twelfth embodiment of the present invention.

FIG. 18 shows a triple-effect absorption chiller having a safety device in accordance with the twelfth embodiment of the present invention. This embodiment has a construction such that pressure relief piping 30a from high temperature regenerator 18 of a multiple-effect, for example, a triple-effect absorption chiller or chiller-heater is branched, and one of the branched pressure relief piping 30b is connected to medium temperature regenerator 40, and the other branched pressure relief piping 30c is connected to low pressure sides such as low temperature regenerator 16 so that the refrigerant vapor and absorption solution may be discharged in parallel fashion not only from high temperature regenerator 18 to medium temperature regenerator 40 but also to low pressure units such as low temperature regenerator 16. The branched pressure relief piping 30b and 30c are designed to be provided with a valve or changed in pipe diameter in order to make the flow rate of vapor appropriate. The valve disposed in the piping 30b is required to have a function as a non-return valve which may prevent the counter-flow or bypassing from the medium temperature regenerator to the low temperature regenerator. The other construction and operation are the same as in the eighth and eleventh embodiments.

Figure 19:
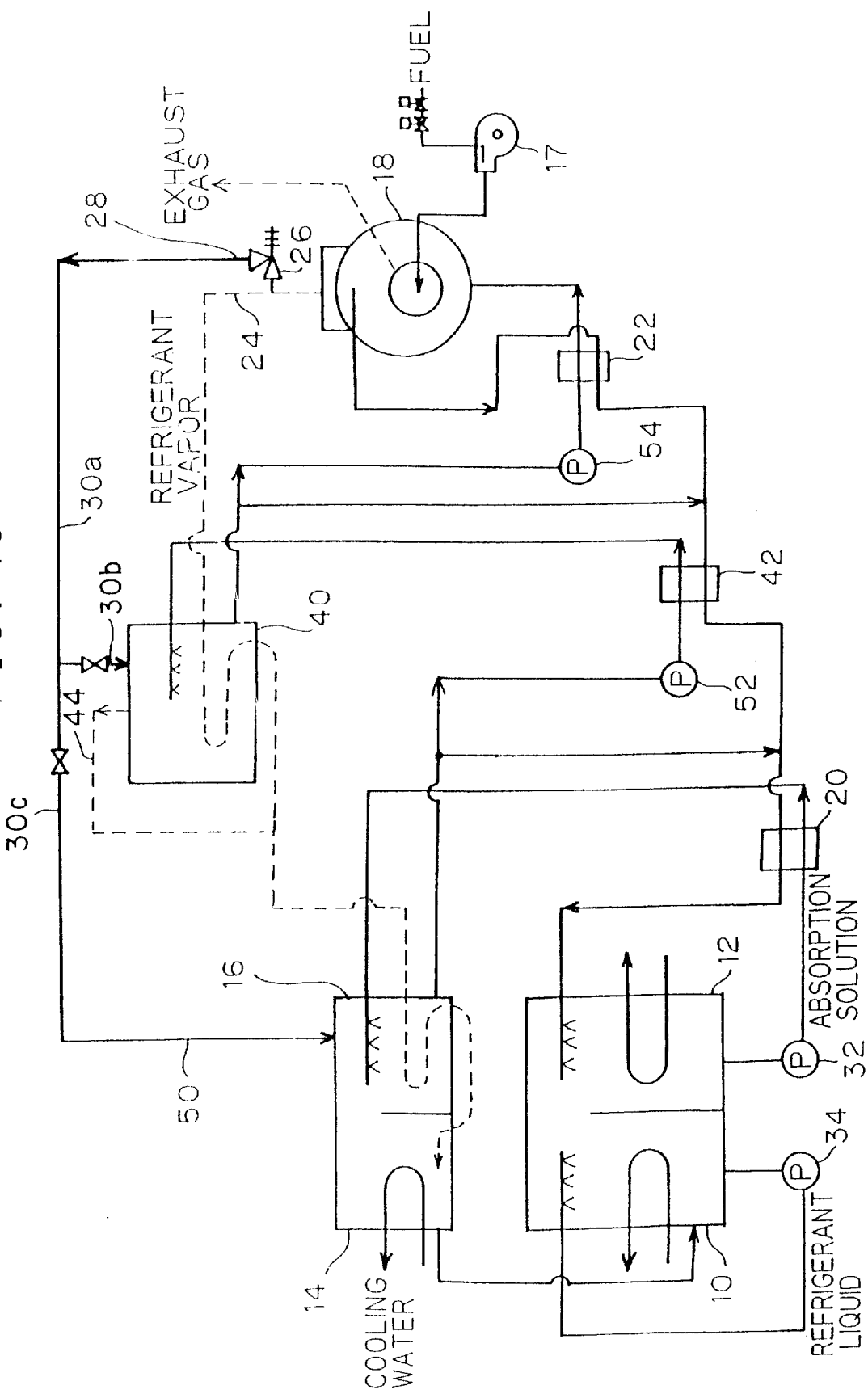
FIG. 19 is a schematic flow diagram of a reverse flow type absorption chiller having a safety device in accordance with the thirteenth embodiment of the present invention.
Figure 20:
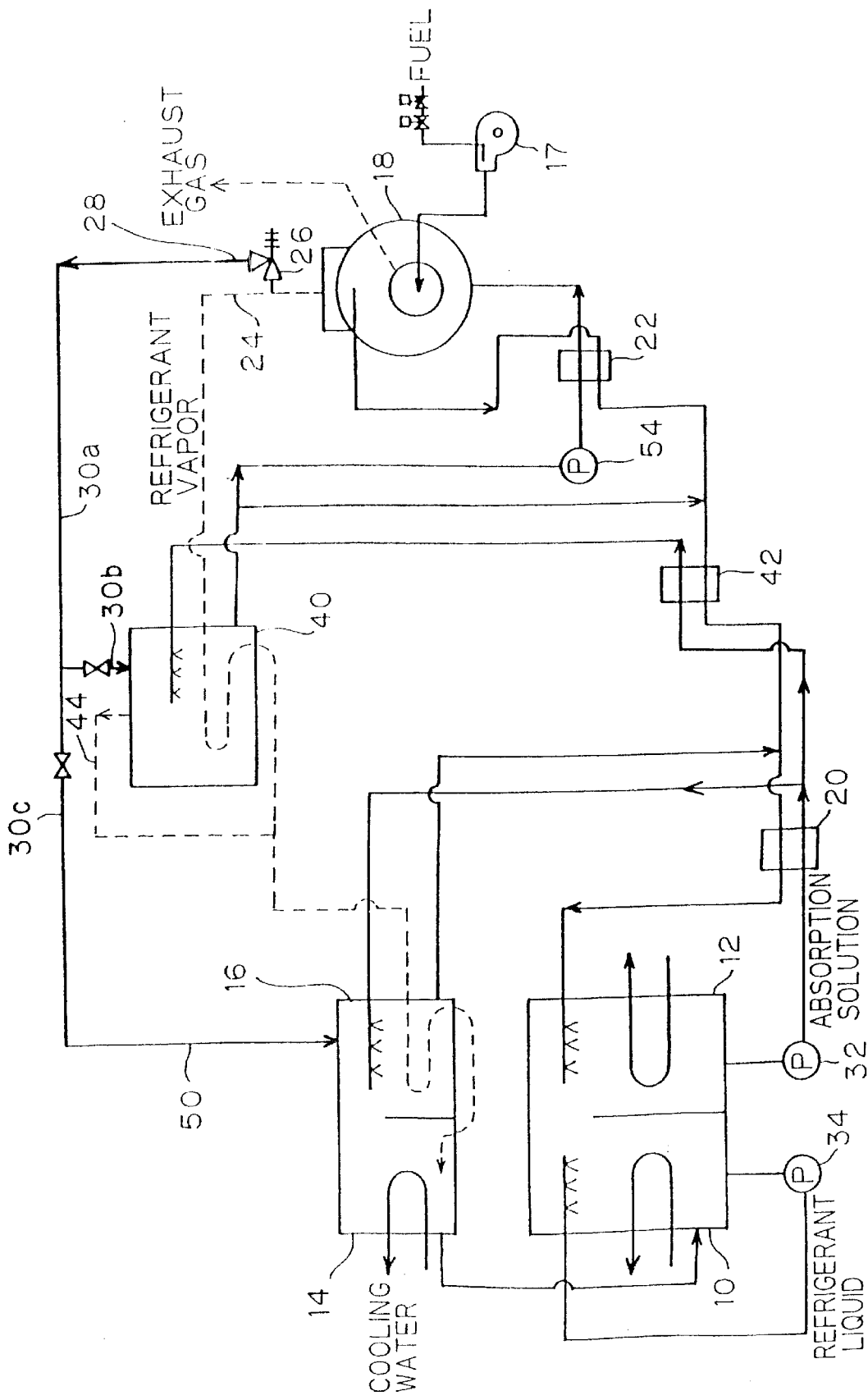
FIG. 20 is a schematic flow diagram of a parallel flow diagram absorption chiller having a safety device in accordance with thirteenth embodiment of the present invention.

FIG. 19 shows a triple-effect absorption chiller having a safety device in accordance with the thirteenth embodiment of the present invention. This embodiment has a construction such that pressure relief piping 30a from high temperature regenerator 18 of a multiple-effect, for example, a triple-effect absorption chiller or chiller-heater is branched, and one of the branched pressure relief piping 30b is connected to medium temperature regenerator 40, and the other branched pressure relief piping 30c is connected to low pressure units such as low temperature regenerator 16 so that the refrigerant vapor and absorption solution may be discharged in parallel fashion not only from high temperature regenerator 18 to medium temperature regenerator 40 but also to low pressure units such as low temperature regenerator 16. The branched pressure relief piping 30b and 30c are designed to be provided with a valve or changed in pipe diameter in order to make the flow rate of vapor appropriate. The valve disposed in the piping 30b is required to have a function as a non-return valve which may prevent the counter-flow or bypassing from the medium temperature regenerator to the low temperature regenerator. As shown in FIG. 20, this embodiment is also applicable to what is called parallel flow type absorption chiller wherein the absorption solution from absorber 12 flows in parallel with low temperature regenerator 16 and medium temperature regenerator 40. The other construction and operation are the same as in the ninth and eleventh embodiments.

Figure 21:
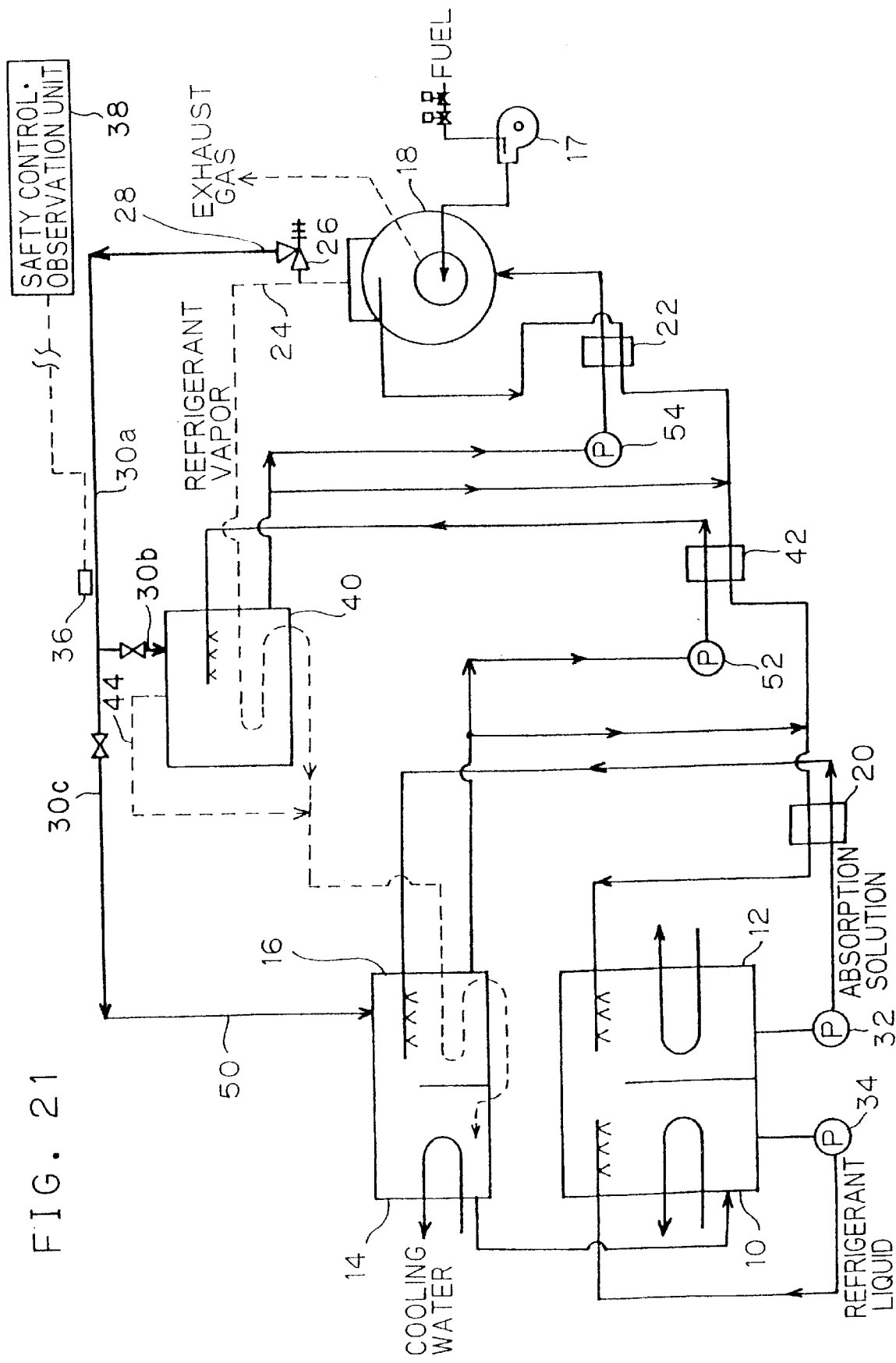
FIG. 21 is a schematic flow diagram of a reverse flow type absorption chiller having a safety device in accordance with the fourteenth embodiment of the present invention.
Figure 22:
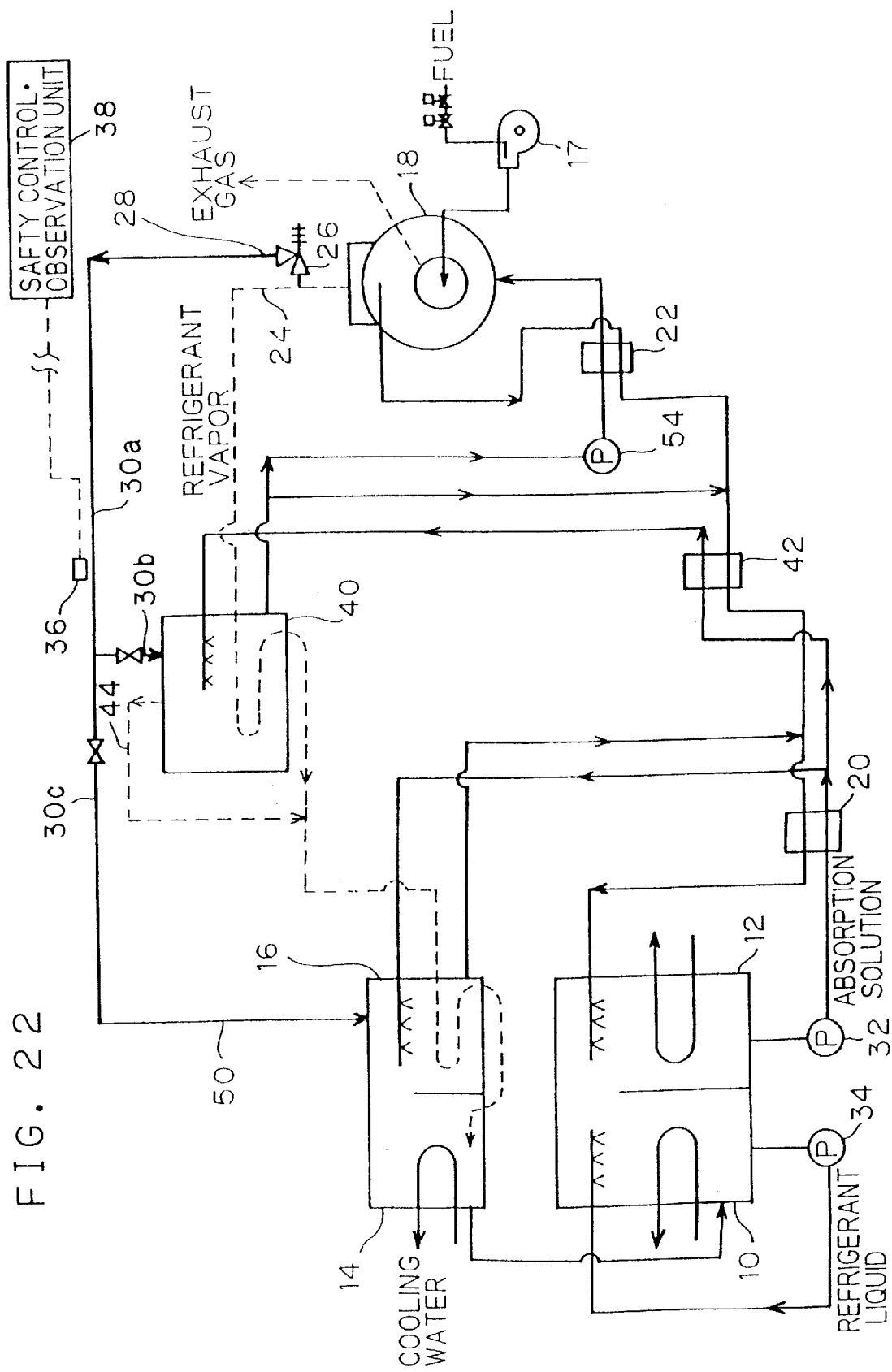
FIG. 22 is a schematic flow diagram of a parallel flow type absorption chiller having a safety device in accordance with the fourteenth embodiment of the present invention.

FIG. 21 shows a triple-effect absorption chiller having a safety device in accordance with the fourteenth embodiment of the present invention. This embodiment has a construction such that pressure relief piping 30a from high temperature regenerator 18 of a multiple-effect, for example, a triple-effect absorption chiller or chiller-heater is branched, and one of the branched pressure relief piping 30b is connected to medium temperature regenerator 40, and the other branched pressure relief piping 30c is connected to low pressure units such as low temperature regenerator 16 so that the refrigerant vapor and absorption solution may be discharged in parallel fashion not only from high temperature regenerator 18 to medium temperature regenerator 40 but also to low pressure units such as low temperature regenerator 16. The branched pressure relief piping 30b and 30c are designed to be provided with a valve or changed in pipe diameter in order to make the flow rate of vapor appropriate. The valve disposed in the piping 30b is required to have a function as a non-return valve which may prevent the counter-flow or bypassing from the medium temperature regenerator to the low temperature regenerator. As shown in FIG. 22, this embodiment is also applicable to what is called parallel flow type absorption chiller wherein the absorption solution from absorber 12 flows in parallel with low temperature regenerator 16 and medium temperature regenerator 40. The other construction and operation are the same as in the tenth and eleventh embodiments.

The present invention having a construction as described will bring about the following advantages.

(1) The discharge opening of pressure rise preventing means such as a safety valve, rapture disk and breakable plate for the high pressure side is connected to the low pressure side in order to prevent open-to-atmosphere trouble. Accordingly, even when the pressure rise preventing means is activated, it is possible to maintain the pressure reduction and to assure safety, avoiding the bad influence to the machine due to corrosion or the like, and also to quickly and readily perform the restoration after activation of the pressure rise preventing means.

(2) When a temperature or pressure measuring device is disposed in the pressure relief piping from the pressure rise preventing means of the high pressure side, and the temperature or pressure measuring device is connected to a safety control monitor unit, it becomes possible, besides the above advantage in (1), to bring about an additional advantage such that there is provided a detector which may detect the temperature change or pressure change of the refrigerant vapor and absorption solution that flows out with the pressure rise preventing means activated and the detected signal may be transmitted to the safety control monitor unit to stop the combustion at the high temperature regenerator or to discontinue the heating source supply to stop the operation and at the same time to inform the abnormality to the outside.

(3) It is also possible to assure safety more precisely when the construction is such that the refrigerant vapor and absorption solution are discharged in parallel fashion from the high temperature regenerator to medium temperature regenerator and to low pressure units such as the low temperature regenerator.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a double-effect absorption chiller/absorption chiller-heater comprising an absorber, an evaporator, a low temperature heat exchanger, a low temperature regenerator, a high temperature heat exchanger, a high temperature regenerator, a condenser, a solution circulating pump, and solution piping and refrigerant piping for the connection of these devices, wherein a pressure rise preventing means is disposed in said high temperature regenerator or in refrigerant vapor piping from said high temperature regenerator, with a discharge opening of said pressure rise preventing means being open to the atmosphere, in order to prevent the pressure rise in said high temperature regenerator when the interior pressure of said high temperature regenerator exceeds the atmospheric pressure or the set pressure level, an absorption chiller/absorption chiller-heater having a safety device, which is characterized in that the discharge opening of said pressure rise preventing means is connected to a low pressure regenerator through pressure relief piping in order that, when the pressure in said high temperature regenerator increases during operation causing the pressure rise preventing means to operate, the refrigerant vapor and absorption solution of a high pressure regenerators will be discharged to said low pressure regenerators designed so as to generally maintain a vacuum therein during operation, thereby preventing open-to-atmosphere trouble and facilitating the restoration after safety assurance.

2. An absorption chiller/absorption chiller-heater having a safety device of claim 1, which uses the combustion heat of a combustion device as a heating source for the high temperature regenerator.

3. An absorption chiller/absorption chiller-heater having a safety device of claim 1, which uses steam as a heating source for the high temperature regenerator.

4. An absorption chiller/absorption chiller-heater having a safety device of claim 1, which uses exhaust gas generated from heat engines as a heating source for the high temperature regenerator.

5. An absorption chiller/absorption chiller-heater having a safety device of claim 1, which comprises a once-through boiler in place of the high temperature regenerator.

6. In a double-effect absorption chiller/absorption chiller-heater comprising an absorber, an evaporator, a low temperature heat exchanger, a low temperature regenerator, a high temperature heat exchanger, a high temperature regenerator, a condenser, a solution circulating pump, and solution piping and refrigerant piping for the connection of these devices, wherein a pressure rise preventing means is disposed in said high temperature regenerator or in a refrigerant vapor piping from said high temperature regenerator, with a discharge opening of said pressure rise preventing means being open to the atmosphere, in order to prevent the pressure rise in said high temperature regenerator when the interior pressure of said high temperature regenerator exceeds to atmospheric pressure or the set pressure level, an absorption chiller/absorption chiller-heater having a safety device, which is characterized in that the discharge opening of said pressure rise preventing means is connected to a low pressure regenerator through pressure relief piping in order that, when the pressure in said high temperature regenerator increases during operation causing the pressure rise preventing means to operate, the refrigerant vapor and absorption solution of a high pressure regenerator will be discharged to said low pressure regenerator designed so as to generally maintain a vacuum therein during operation, thereby preventing open-to-atmosphere trouble and facilitating the restoration after safety assurance, and a temperature measuring device or pressure measuring device is disposed in the pressure relief piping to detect the temperature or pressure change in case of refrigerant vapor and absorption outflow with the pressure rise preventing means of the high pressure side activated, and further a temperature measuring device or pressure measuring device is electrically connected to a safety control monitor unit, which may detect the temperature or pressure change and stop the heating source supply to said high temperature regenerator to discontinue the operation and at the same time to inform the abnormality to the outside.

7. An absorption chiller/absorption chiller-heater having a safety device of claim 6, which uses the combustion heat of a combustion device as a heating source for the high temperature regenerator.

8. An absorption chiller/absorption chiller-heater having a safety device of claim 6, which uses steam as a heating source for the high temperature regenerator.

9. An absorption chiller/absorption chiller-heater having a safety device of claim 2, which uses exhaust gas generated from heat engines as a heating source for the high temperature regenerator.

10. An absorption chiller/absorption chiller-heater having a safety device of claim 6, which comprises a once-through boiler in place of the high temperature regenerator.

11. In a multiple-effect absorption chiller/absorption chiller-heater comprising an absorber, an evaporator, a low temperature heat exchanger, a low temperature regenerator, a medium temperature heat exchanger, a medium temperature regenerator, a high temperature heat exchanger, a high temperature regenerator, a condenser, a solution circulating pump, and solution piping and refrigerant piping for the connection of these devices, wherein a pressure rise preventing means is disposed in said high temperature regenerator or in refrigerant vapor piping from said high temperature regenerator, with a discharge opening of the pressure rise preventing means being open to the atmosphere, in order to prevent the pressure rise in said high temperature regenerator when the interior pressure of said high temperature regenerator exceeds the atmospheric pressure or the set pressure level, an absorption chiller/absorption chiller-heater having a safety device, which is characterized in that the discharge opening of said pressure rise preventing means is connected to said medium temperature regenerator through pressure relief piping in order that, when the pressure in said high temperature regenerator increases during operation causing the pressure rise preventing means to operate, the refrigerant vapor and absorption solution of a high pressure regenerator will be discharged to said medium temperature regenerator where the pressure level becomes low, thereby preventing open-to-atmosphere trouble and facilitating the restoration after safety assurance, and further a pressure rise preventing means is disposed in said medium temperature regenerator or in the refrigerant vapor piping from said medium temperature regenerator, and the discharge opening of the pressure rise preventing means of said medium temperature regenerator is connected to a low pressure regenerator through pressure relief piping in order that, when the pressure in said medium temperature regenerator increases during operation causing the pressure rise preventing means of said medium temperature regenerator to be activated, the refrigerant vapor and absorption of the medium pressure side will be discharged to said low pressure regenerator designed so as to generally maintain a vacuum during operation, thereby preventing open-to-atmosphere trouble and also facilitating the restoration after safety assurance.

12. An absorption chiller/absorption chiller-heater having a safety device of claim 11, which uses a safety valve as a pressure rise preventing means of the high pressure side and a rapture disk as a pressure rise preventing means of the medium pressure side.

13. An absorption chiller/absorption chiller-heater having a safety device of claim 11, which uses the combustion heat of a combustion device as a heating source for the high temperature regenerator.

14. An absorption chiller/absorption chiller-heater having a safety device of claim 11, which uses steam as a heating source for the high temperature regenerator.

15. An absorption chiller/absorption chiller-heater having a safety device of claim 3, which uses exhaust gas generated from heat engines as a heating source for the high temperature regenerator.

16. An absorption chiller/absorption chiller-heater having a safety device of claim 11, which comprises a once-through boiler in place of the high temperature regenerator.

17. In a multiple-effect absorption chiller/absorption chiller-heater comprising an absorber, an evaporator, a low temperature heat exchanger, a low temperature regenerator, a medium temperature heat exchanger, a medium temperature regenerator, a high temperature heat exchanger, a high temperature regenerator, a condenser, a solution circulating pump, and solution piping and refrigerant piping for the connection of these devices, wherein a pressure rise preventing means is disposed in said high temperature regenerator or m refrigerant vapor piping from said high temperature regenerator, with a discharge opening of the pressure rise preventing means being open to the atmosphere, in order to prevent the pressure rise in said high temperature regenerator when the interior pressure of said high temperature regenerator exceeds the atmospheric pressure or the set pressure level, an absorption chiller/absorption chiller-heater having a safety device, which is characterized in that the discharge opening of said pressure rise preventing means is connected to said medium temperature regenerator through pressure relief piping in order that, when the pressure in said high temperature regenerator increases during operation causing the pressure rise preventing means to operate, the refrigerant vapor and absorption solution of the high pressure side will be discharged to said medium temperature regenerator where the pressure level becomes low, thereby preventing open-to-atmosphere trouble and facilitating the restoration after safety assurance, and further a pressure rise preventing means is disposed in said medium temperature regenerator or in the refrigerant vapor piping from said medium temperature regenerator, and the discharge opening of the pressure rise preventing means of said medium temperature regenerator is connected to a low pressure regenerator through pressure relief piping in order that, when the pressure in said medium temperature regenerator increases during operation causing the pressure rise preventing means of said medium temperature regenerator to operate, the refrigerant vapor and absorption of the medium pressure side will be discharged to said low pressure regenerator designed so as to generally maintain a vacuum therein during operation, thereby preventing open-to-atmosphere trouble and also facilitating the restoration after safety assurance, and a temperature measuring device or pressure measuring device is disposed in the pressure relief piping from the high pressure side to detect the temperature or pressure change in case of refrigerant vapor and absorption solution outflow with the pressure rise preventing means of the high pressure side activated, and further a temperature measuring device or pressure measuring device is electrically connected to a safety control monitor unit, which may detect the temperature or pressure change and stop the heating source supply to said high temperature regenerator to discontinue the operation and at the same time to inform the abnormality to the outside.

18. An absorption chiller/absorption chiller-heater having a safety device of claim 17, which uses a safety valve as a pressure rise preventing means of the high pressure side and a rapture disk as a pressure rise preventing means of the medium pressure side.

19. An absorption chiller/absorption chiller-heater having a safety device of claim 17, which uses the combustion heat of a combustion device as a heating source for the high temperature regenerator.

20. An absorption chiller/absorption chiller-heater having a safety device of claim 17, which uses steam as a heating source for the high temperature regenerator.

21. An absorption chiller/absorption chiller-heater having a safety device of claim 17, which uses exhaust gas generated from heat engines as a heating source for the high temperature regenerator.

22. An absorption chiller/absorption chiller-heater having a safety device of claim 17, which comprises a once-through boiler in place of the high temperature regenerator.

23. In a multiple-effect absorption chiller/absorption chiller-heater comprising an absorber, an evaporator, a low temperature heat exchanger, a low temperature regenerator, a medium temperature heat exchanger, a medium temperature regenerator, a high temperature heat exchanger, a high temperature regenerator, a condenser, a solution circulating pump, and solution piping and refrigerant piping for the connection of these devices, wherein a pressure rise preventing means is disposed in said high temperature regenerator or in refrigerant vapor piping from said high temperature regenerator, with a discharge opening of the pressure rise preventing means being open to the atmosphere, in order to prevent the pressure rise in said high temperature regenerator when the interior pressure of said high temperature regenerator exceeds the atmospheric pressure or the set pressure level, an absorption chiller/absorption chiller-heater having a safety device, which is characterized in that the discharge opening of said pressure rise preventing means is connected to a low pressure regenerator though pressure relief piping in order that, when the pressure in said high temperature regenerator increases during operation causing the pressure rise preventing means to operate, the refrigerant vapor and absorption solution of the high pressure side will be parallel-discharged to said low pressure regenerator such as the low temperature regenerator designed so as to generally maintain a vacuum therein during operation and to the medium temperature regenerator where the pressure level becomes low, thereby preventing open-to-atmosphere trouble and facilitating the restoration after safety assurance.

24. An absorption chiller/absorption chiller-heater having a safety device of claim 23, which uses the combustion heat of a combustion device as a heating source for the high temperature regenerator.

25. An absorption chiller/absorption chiller-heater having a safety device of claim 23, which uses steam as a heating source for the high temperature regenerator.

26. An absorption chiller/absorption chiller-heater having a safety device of claim 23, which uses exhaust gas generated from heat engines as a heating source for the high temperature regenerator.

27. An absorption chiller/absorption chiller-heater having a safety device of claim 23, which comprises a once-through boiler in place of the high temperature regenerator.

28. In a multiple-effect absorption chiller/absorption chiller-heater comprising an absorber, an evaporator, a low temperature heat exchanger, a low temperature regenerator, a medium temperature heat exchanger, a medium temperature regenerator, a high temperature heat exchanger, a high temperature regenerator, a condenser, a solution circulating pump, and solution piping and refrigerant piping for the connection of these devices, wherein a pressure rising preventing means is disposed in said high temperature regenerator or in refrigerant vapor piping from said high temperature regenerator, with a discharge opening of the pressure rise preventing means being open to the atmosphere, in order to prevent the pressure rise in said high temperature regenerator when the interior pressure of said high temperature regenerator exceeds the atmospheric pressure or the set pressure level, an absorption chiller/absorption chiller-heater having a safety device, which is characterized in that the discharge opening of said pressure rise preventing means is connected to a low pressure regenerator through pressure relief piping in order that, when the pressure in said high temperature regenerator increases during operation causing the pressure rise preventing means to operate, the refrigerant vapor and absorption solution of the high pressure side will be parallel-discharged to said low pressure regenerator such as the low temperature regenerator designed so as to generally maintain a vacuum therein during operation and to the medium temperature regenerator where the pressure level becomes low, thereby preventing open-to-atmosphere trouble and facilitating the restoration after safety assurance, and a temperature measuring device or pressure measuring device is disposed in the pressure relief piping from the high pressure side to detect the temperature or pressure change in case of refrigerant vapor and absorption outflow with the pressure rise preventing means of the high pressure side activated, and further a temperature measuring device or pressure measuring device is electrically connected to a safety control monitor unit, which may detect the temperature or pressure change and stop the heating source supply to said high temperature regenerator to discontinue the operation and at the same time to inform the abnormality to the outside.

29. An absorption chiller/absorption chiller-heater having a safety device of claim 28, which uses the combustion heat of a combustion device as a heating source for the high temperature regenerator.

30. An absorption chiller/absorption chiller-heater having a safety device of claim 28, which uses steam as a heating source for the high temperature regenerator.

31. An absorption chiller/absorption chiller-heater having a safety device of claim 28, which uses exhaust gas generated from heat engines as a heating source for the high temperature regenerator.

32. An absorption chiller/absorption chiller-heater having a safety device of claim 28, which comprises a once-through boiler in place of the high temperature regenerator.

* * * * *

UNITED STATES PATENT AND TRADEMARK OFFICE
CERTIFICATE OF CORRECTION

PATENT NO.    : 6,550,272 B2
DATED         : April 22, 2003
INVENTOR(S)   : Kunihiko Nakajima et al.

It is certified that error appears in the above-identified patent and that said Letters Patent is hereby corrected as shown below:

Column 18,
Line 59, "m" should be -- in --.

Column 20,
Line 11, "though" should be -- through --.

Signed and Sealed this

Twenty-second Day of July, 2003

JAMES E. ROGAN
*Director of the United States Patent and Trademark Office*